(12) United States Patent
Morioka et al.

(10) Patent No.: US 10,199,700 B2
(45) Date of Patent: Feb. 5, 2019

(54) TEMPERATURE ADJUSTING STRUCTURE AND TEMPERATURE ADJUSTING METHOD FOR ELECTRIC POWER STORAGE DEVICE

(71) Applicant: TOYOTA JIDOSHA KABUSHIKI KAISHA, Toyota-shi, Aichi-ken (JP)

(72) Inventors: Satoshi Morioka, Okazaki (JP); Junta Katayama, Miyoshi (JP); Hirotaka Watanabe, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 134 days.

(21) Appl. No.: 14/917,041

(22) PCT Filed: Sep. 8, 2014

(86) PCT No.: PCT/IB2014/001758
§ 371 (c)(1),
(2) Date: Mar. 7, 2016

(87) PCT Pub. No.: WO2015/036828
PCT Pub. Date: Mar. 19, 2015

(65) Prior Publication Data
US 2016/0204487 A1    Jul. 14, 2016

(30) Foreign Application Priority Data

Sep. 10, 2013   (JP) .................................. 2013-187253

(51) Int. Cl.
*H01M 10/6566*   (2014.01)
*H01M 10/625*    (2014.01)
(Continued)

(52) U.S. Cl.
CPC ..... *H01M 10/6566* (2015.04); *H01M 10/613* (2015.04); *H01M 10/625* (2015.04);
(Continued)

(58) Field of Classification Search
CPC .......... H01M 10/613; H01M 10/6566; H01M 10/6557; H01M 10/6563; H01M 10/617;
(Continued)

(56) References Cited

U.S. PATENT DOCUMENTS

2003/0113621 A1* 6/2003 Shimamura ......... H01M 2/0212
429/162
2007/0285051 A1* 12/2007 Jeon .................. H01M 10/0413
320/112
(Continued)

FOREIGN PATENT DOCUMENTS

CN    101142701 A    3/2008
CN    102376920 A    3/2012
(Continued)

OTHER PUBLICATIONS

International Search Report of PCT/IB2014/001758, dated Jan. 21, 2015. [PCT/ISA/210].
(Continued)

*Primary Examiner* — Imran Akram
(74) *Attorney, Agent, or Firm* — Sughrue Mion, PLLC

(57) ABSTRACT

In a temperature adjusting structure for an electric power storage device as well as in a temperature adjusting method for an electric power storage device, a temperature adjusting air that exchanges heat with a case in which an electric power generation element is housed is guided in a longitudinal direction of a circulation path. Then, a vortex flow that swirls with the longitudinal direction being a rotational axis is generated in the air that flows through the circulation path, and the vortex flow is brought into contact with a lateral surface of the case.

4 Claims, 19 Drawing Sheets

(51) Int. Cl.
*H01M 10/613* (2014.01)
*H01M 10/6563* (2014.01)
*H01M 10/6565* (2014.01)
*H01M 10/647* (2014.01)

(52) U.S. Cl.
CPC ... *H01M 10/6563* (2015.04); *H01M 10/6565* (2015.04); *H01M 10/647* (2015.04); *H01M 2220/20* (2013.01)

(58) Field of Classification Search
CPC .............. H01M 6/5038; H01M 10/60; H01M 10/6551; H01M 10/6561; H01M 10/6562; H01M 10/6564; H01M 10/6565
See application file for complete search history.

(56) References Cited

U.S. PATENT DOCUMENTS

| | | | | |
|---|---|---|---|---|
| 2008/0003491 | A1* | 1/2008 | Yahnker | B25F 5/008 429/62 |
| 2009/0104511 | A1* | 4/2009 | Maguire | B60L 11/1874 429/120 |
| 2009/0155680 | A1 | 6/2009 | Maguire et al. | |
| 2010/0092848 | A1* | 4/2010 | Choi | H01M 2/1077 429/99 |
| 2010/0297486 | A1* | 11/2010 | Fujii | H01M 10/625 429/120 |
| 2011/0104547 | A1* | 5/2011 | Saito | H01M 2/1077 429/120 |
| 2011/0318627 | A1* | 12/2011 | Fujiwara | B60K 1/04 429/120 |
| 2012/0009446 | A1* | 1/2012 | Mizuguchi | H01M 2/1077 429/71 |
| 2012/0009456 | A1* | 1/2012 | Sohn | H01M 2/1077 429/120 |
| 2012/0040225 | A1 | 2/2012 | Raiser | |
| 2013/0119937 | A1* | 5/2013 | Arseneault | H01M 10/443 320/130 |
| 2013/0130080 | A1* | 5/2013 | Yoon | H01M 10/6556 429/83 |
| 2013/0280566 | A1* | 10/2013 | Chung | H01M 2/1077 429/83 |
| 2014/0154538 | A1 | 6/2014 | Suzuki et al. | |
| 2014/0220404 | A1* | 8/2014 | Masuda | H01M 2/1077 429/120 |

FOREIGN PATENT DOCUMENTS

| | | |
|---|---|---|
| JP | 2009-134936 A | 6/2009 |
| JP | 2012-238522 A | 12/2012 |
| JP | 2012-238603 A | 12/2012 |
| JP | 2013-30348 A | 2/2013 |
| KR | 10-2009-0091942 A | 8/2009 |

OTHER PUBLICATIONS

Written Opinion of PCT/IB2014/001758, dated Jan. 21, 2015. [PCT/ISA/237].

\* cited by examiner

TEMPERATURE ADJUSTING STRUCTURE AND TEMPERATURE ADJUSTING METHOD FOR ELECTRIC POWER STORAGE DEVICE

CROSS REFERENCE TO RELATED APPLICATIONS

This application is a National Stage of International Application No. PCT/IB2014/001758 filed Sep. 8, 2014, claiming priority based on Japanese Patent Application No. 2013-187253, filed Sep. 10, 2013, the contents of all of which are incorporated herein by reference in their entirety.

BACKGROUND OF THE INVENTION

1. Field of the Invention

The present invention relates to a temperature adjusting structure and a temperature adjusting method for an electric power storage device.

2. Description of Related Art

A battery assembly can be configured by stacking a plurality of batteries. At this time, a space through which cooling air flows can be formed between two each of the batteries that are arranged in a stacked manner by alternately stacking the batteries and spacers. The battery assembly is cooled when the cooling air flows through the space that is formed by the spacer (for example, Japanese Patent Application Publication No. 2012-238603 (JP 2012-238603 A)).

In a cooling structure of JP 2012-238603 A, the space through which the cooling air flows is provided by arranging the spacer between the batteries that are adjacent to each other in a stacking direction. Consequently, the battery assembly is enlarged. Considering this problem, the battery assembly is configured by stacking the batteries tightly without providing the spacer. In this case, the battery assembly can be cooled by bringing the cooling air into contact with a periphery of the battery assembly, for example, a lateral surface thereof.

However, the battery assembly cannot be cooled efficiently if the cooling air flows while simply contacting the lateral surface of the battery assembly that extends in the stacking direction. For example, in a case where the cooling air flows uniformly in the stacking direction of the battery assembly for cooling, cooling efficiency is degraded on a downstream side in a flowing direction of the cooling air. More specifically, when the cooling air that has exchanged heat with the battery positioned on an upstream side simply exchanges heat with the battery on the downstream side, the battery on the downstream side is influenced by the cooling air whose temperature has been increased on the upstream side.

Just as described, when the cooling air flows uniformly in the stacking direction, and the cooling air contacts the lateral surface of the battery assembly, a surface of the battery assembly that contacts the cooling air along the flowing direction of the cooling air (a cooling length) is extended. This causes thickening of a temperature boundary layer as the temperature boundary layer advances to the downstream. Consequently, the cooling efficiency of the battery assembly is lowered. In view of the above, it is considered to let the cooling air flow uniformly along a longitudinal direction of the lateral surface the battery assembly (the battery) that is orthogonal to the stacking direction. However, also in this case, the cooling length is extended in the flowing direction of the cooling air. Thus, due to the same reason as above, the battery assembly cannot be cooled efficiently.

SUMMARY OF THE INVENTION

In view of the above, the present invention provides a temperature adjusting structure for an electric power storage device in which electric power storage elements, each of which includes a case for housing an electric power generation element performing charging and discharging, are stacked. In the electric power storage device, temperature adjusting air is brought into contact with a lateral surface of the case for the electric power storage element, so as to efficiently adjust a temperature of the electric power storage element. The temperature adjusting structure allows downsizing of the electric power storage device.

The temperature adjusting structure of the electric power storage device in the present invention has following configurations. The electric power storage device is configured by including the plural electric power storage elements that are aligned in a specified direction. The electric power storage element is configured by including the electric power generation element that is housed in the case, and the electric power generation element performs charging and discharging. The temperature adjusting structure includes a circulation path and a vortex flow generation section. The circulation path is provided on a lateral surface of the case. A longitudinal direction of the circulation path is a direction in which a bottom surface of the case faces a surface that opposes the bottom surface. The lateral surface is a surface that is positioned on both sides in a horizontal direction when the electric power storage device is seen in the specified direction. The circulation path is configured to guide the temperature adjusting air in the longitudinal direction, and the air exchanges heat with the case. The vortex flow generation section is configured to generate a vortex flow of the air that flows into the circulation path, the vortex flow swirling with the longitudinal direction being a rotational axis.

According to the present invention, the temperature adjusting air is brought into contact with the lateral surface of each of the plural electric power storage elements that constitutes the electric power storage device, and the vortex flow of the air that swirls with the longitudinal direction of the lateral surface being the rotational axis is generated. Accordingly, since the swirling vortex flow contacts the lateral surface with a width direction of the lateral surface that is orthogonal to the longitudinal direction being a first contact length, the contact length (a cooling length) is reduced. In addition, the swirling vortex flow that advances in the longitudinal direction suppresses an increase in a temperature boundary layer of a second contact length in the longitudinal direction of the lateral surface of the case. Thus, a temperature of the electric power storage element can be adjusted efficiently on the lateral surface of the case of the electric power storage element without bringing the air into contact with a space between the stacked electric power storage elements, and the electric power storage device can be downsized.

The circulation path may include a first wall section and a second wall section. The first wall section opposes the lateral surface in the horizontal direction and extends in the longitudinal direction. The second wall section covers a space between the lateral surface and the first wall section in a width direction that is orthogonal to the horizontal direction and extends in the longitudinal direction. The vortex flow generation section may include a blowoff port through which the air flows into the circulation path. A length of the blowoff port in the width direction may be smaller than a length in the width direction and a length in the horizontal direction of a flow path cross section in the horizontal direction of the circulation path.

With such a configuration, a laminar flow of the air that has the smaller width than the length in the width direction and the length in the horizontal direction of the flow path cross section in the horizontal direction of the circulation path flows into the circulation path from the blowoff port. Thus, it is possible to generate the swirling vortex flow with the longitudinal direction being the rotational axis and the width direction of the lateral surface of the case being the contact length.

The temperature adjusting structure described above may further include a partition wall that divides the circulation path along the longitudinal direction. The blowoff port may be configured to be provided in the each circulation path that is divided by the partition wall and extends in the longitudinal direction. With such a configuration, the plural swirling vortex flows with the longitudinal direction being the rotational axis with respect to the lateral surface of the case are generated. Thus, the first cooling length between the swirling vortex flow and the lateral surface of the case can further be reduced, and the cooling efficiency can further be improved.

The temperature adjusting structure described above may further include: a supply path that guides the air to the bottom surface such that the air is supplied in a substantially perpendicular direction to the bottom surface of the case; and a guide surface that circulates the air along the bottom surface, the air flowing from the supply path to exchange heat with the bottom surface. The air that circulates along the bottom surface by the guide surface may be configured to be supplied to the circulation path via the vortex flow generation section. With such a configuration, downsizing of the electric power storage device can be realized, and the temperature of the electric power storage element can be adjusted efficiently.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A description will hereinafter be made on embodiments of the present invention.

Figure 1:
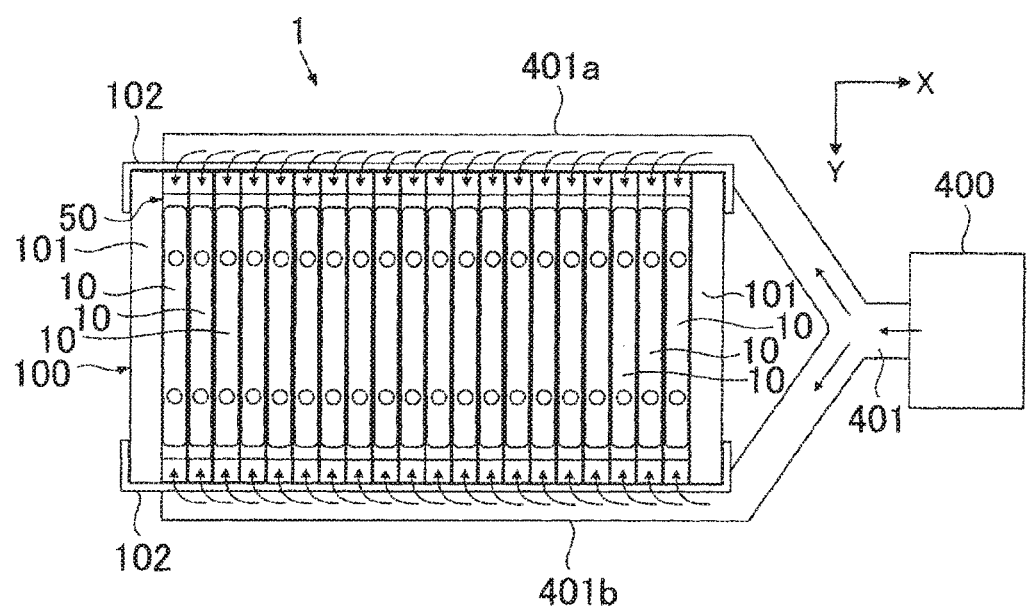
FIG. 1 is a schematic top view of a battery pack in a first embodiment.

FIG. 1 to FIG. 9 are views of a first embodiment of the present invention. FIG. 1 is a schematic top view of an example of a temperature adjusting structure of a battery pack. In FIG. 1 and the like, an X-axis, a Y-axis, and a Z-axis are orthogonal to each other. A relationship among the X-axis, the Y-axis, and the Z-axis is the same in other drawings. In this embodiment, an axis that corresponds to a vertical direction is set as the Z-axis.

A battery pack 1 can be mounted in a vehicle. The battery pack 1 is fixed to a floor panel (a body) of the vehicle. For example, the battery pack 1 can be arranged in a space under a seat such as a front seat or a rear seat in a cabin, a space between the front seats, a luggage space that is positioned at the rear of the rear seat, or the like.

The battery pack 1 outputs energy that is used for traveling of the vehicle. As the vehicle, a hybrid vehicle or an electric vehicle can be raised. The hybrid vehicle is a vehicle that includes the battery pack 1 and another power source such as a fuel cell or an internal combustion engine as power sources for traveling the vehicle. The electric vehicle is a vehicle that only includes the battery pack 1 as the power source of the vehicle.

The battery pack 1 is connected to a motor generator. The motor generator can generate kinetic energy for traveling the vehicle by receiving electric power from the battery pack 1. The motor generator is connected to wheels, and the kinetic energy that is generated by the motor generator is transmitted to the wheels. When the vehicle is decelerated or brought to a stop, the motor generator converts the kinetic energy that is generated upon braking of the vehicle to electric energy. The electric energy that is generated by the motor generator can be stored in the battery pack 1.

A DC-to-DC converter or an inverter can be arranged in a current path between the battery pack 1 and the motor generator. By using the DC-to-DC converter, an output voltage of the battery pack 1 can be increased and supplied to the motor generator, or a voltage from the motor generator can be reduced and supplied to the battery pack 1. In addition, by using the inverter, a DC current that is output from the battery pack 1 can be converted to an AC current, and an AC motor can be used as the motor generator.

As shown in FIG. 1, a battery assembly 100 is an example of the electric power storage device of the present invention. The battery assembly 100 has a plurality of unit cells 10, the plurality of unit cells 10 is aligned in a specified direction (an X direction). The unit cell 10 is an example of the electric power storage element of the present invention. The plurality of unit cells 10 is electrically connected in series by a bus bar. The battery assembly 100 may include the plurality of unit cells 10 that is electrically connected in parallel.

A secondary battery such as a nickel hydrogen battery or a lithium ion battery can be used as the unit cell 10. In addition, an electric double-layered capacitor (condenser) can be used instead of the secondary battery.

In this embodiment, the plurality of unit cells 10 is aligned in one direction; however, a configuration of the unit cells 10 is not limited to this. Specifically, one battery module can be configured by including the two or more unit cells, and a plurality of the battery modules can be aligned in the X-direction. The plurality of the unit cells that is included in the one battery module can electrically be connected in series.

A pair of end plates 101 is arranged at both ends of the battery assembly 100 in an arrangement direction (the X-direction) in which the plurality of unit cells 10 is aligned. The pair of end plates 101 holds the plurality of unit cells 10 that constitutes the battery assembly 100 therebetween, and is used to apply a restraining force to the plurality of unit cells 10. The restraining force is a force to hold the unit cells 10 between the pair of end plates 101 in the X-direction. It is possible by applying the restraining force to each of the unit cells 10 to suppress inflation of the unit cell 10 and to suppress degradation of an input/output characteristic of the unit cell 10.

More specifically, both ends of a restraining band 102 that extends in the X-direction are connected to the pair of end plates 101. Accordingly, the pair of end plates 101 can apply the restraining force to the plurality of unit cells 10. The restraining band 102 is arranged on right and left side surfaces (lateral surfaces in a Y-direction) of the battery assembly 100 via a guide section 50, which will be described below. A position to arrange and the number of the restraining band 102 can appropriately be set, and the both ends of the restraining band 102 only needs to be connected to the pair of end plates 101. For example, the restraining band 102 may be arranged on an upper side surface of the battery assembly 100 in a Z-direction. An upper side indicates a positive side in the Z-direction in the drawings.

Figure 2:
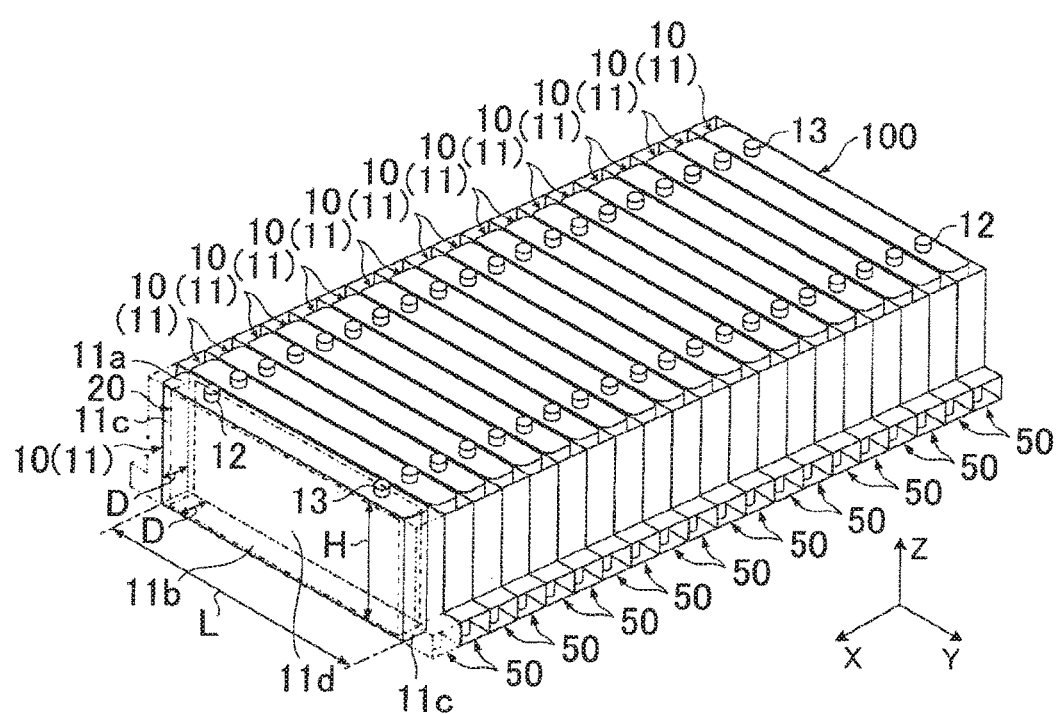
FIG. 2 is a schematic perspective view of an example of a battery assembly that includes a temperature adjusting structure in the first embodiment.

FIG. 2 is an exterior perspective view of the battery assembly 100 that includes the guide section 50 of this embodiment. The guide section 50 that constitutes a temperature adjusting structure of the battery pack 1 is arranged for each of the unit cells 10 that constitutes the battery assembly 100.

As shown in FIG. 2, the unit cell 10 has a cell case 11 in which an electric power generation element 20 is housed. The unit cell 10 is a so-called square cell, and the cell case 11 is formed in a rectangular parallelepiped shape. The cell case 11 can be formed of metal, for example.

An upper surface 11a of the cell case 11 is provided with a positive electrode terminal 12 and a negative electrode terminal 13 that are connected to the electric power generation element 20, the electric power generation element 20 being housed in the cell case 11. For example, when the cell case 11 is configured by including a case body and a lid that form a housing space for the electric power generation element 20, the upper surface 11a corresponds to the lid that closes an opening of the case body for incorporating the electric power generation element 20 from above. The lid and the case body can be fixed by welding, for example, and the inside of the cell case 11 is brought into a tightly sealed state. Here, the above indicates a positive side in the Z-direction in the drawing.

The upper surface 11a can be provided with a valve (not shown) that discharges gas to the outside of the cell case 11 when the gas is produced in the cell case 11. The upper surface 11a can also be provided with a liquid injection port (not shown). The liquid injection port is used to inject an electrolytic solution into the cell case 11, and is closed by a liquid injection plug.

The electric power generation element 20 has a positive electrode element, a negative electrode element, and a separator that is arranged between the positive electrode element and the negative electrode element. The positive electrode element has a current collector and a positive electrode active material layer that is formed on a surface of the current collector. The negative electrode element has a current collector and a negative electrode active material layer that is formed on a surface of the current collector. The separator, the positive electrode active material layer, and the negative electrode active material layer are soaked in the electrolytic solution. A solid electrolyte can be used instead of the electrolytic solution.

In the unit cell 10 of this embodiment, a surface provided with the positive electrode terminal 12 and the negative electrode terminal 13 is the upper surface 11a of the unit cell 10, and a lower surface that opposes the upper surface 11a with the electric power generation element 20 being interposed therebetween in the Z-direction is a bottom surface 11b. When the battery assembly 100 is seen in the arrangement direction (the X-direction), a surface that is located on both sides in a horizontal direction (the Y-direction) is a lateral surface 11c of the cell case 11. A longitudinal direction of the lateral surface 11c is the Z-direction in which the bottom surface 11b and the upper surface 11a that opposes the bottom surface 11b face each other. A surface that extends in the Y-direction with respect to the two lateral surfaces 11c, which are separately arranged on the both sides in the horizontal direction, and that faces the another adjacent unit cell 10 is a stacking surface 11d.

The unit cell 10 of this embodiment has a long side in the Y-direction, and has a length L in the Y-direction, a width D in the X-direction, and a height H in the Z-direction. Each of the upper surface 11a and the bottom surface 11b of the unit cell 10 has the length L in the Y-direction and the width D in the X-direction. The lateral surface 11c has the width D in the X-direction and the height H in the Z-direction. The stacking surface 11d has the length L in the Y-direction and the height H in the Z-direction.

In the example of FIG. 2, the guide section 50 that is provided in each of the unit cells 10 for constituting the battery assembly 100 contacts the stacking surface 11d that is orthogonal to the arrangement direction of the unit cell 10, and electrically insulates the adjacent unit cells 10 in the stacking direction (the X-direction). In this embodiment, a space between the two unit cells 10 that are adjacently arranged is closed by the guide section 50, and thus a space in which temperature adjusting air circulates is not provided between the unit cells 10. Each of the unit cells 10 that constitutes the battery assembly 100 of this embodiment is tightly arranged in the stacking direction via the guide section 50. The guide section 50 can be formed of an insulating material such as a resin.

Returning to FIG. 1, a blower 400 supplies the temperature adjusting air into the battery pack 1. An air intake duct 401 is connected to an outlet port of the blower 400. The air intake duct 401 is branched into two in the Y-direction. One branched duct 401a is arranged on one lateral surface of the battery assembly 100 and extends in the stacking direction. Meanwhile, another branched duct 401b is arranged on another lateral surface of the battery assembly 100 and extends in the stacking direction.

Each of the branched ducts 401a, 401b is connected to the guide section 50 that is provided in the each unit cell 10. By driving a blower motor, the blower 400 suctions the air in the cabin from an inlet port and supplies the air to the each guide section 50 through the air intake duct 401.

The temperature adjusting air contacts an outer surface of the unit cell 10, that is, a surface of the cell case 11 and exchanges heat with the cell case 11, in which the air and the electric power generation element are housed. For example, when the unit cell 10 generates heat by charging, discharging, and the like, a temperature increase of the unit cell 10 can be suppressed by bringing cooling air into contact with the unit cell 10. On the other hand, when the unit cell 10 is excessively cooled, a temperature reduction of the unit cell 10 can be suppressed by bringing heating air into contact with the unit cell 10.

The air in the cabin is set at a temperature that is suited for temperature adjustment of the unit cell 10 by an air conditioning device or the like that is mounted in the vehicle. Thus, the temperature adjustment of the unit cell 10 can be performed by supplying the air in the cabin to the unit cell 10. It is possible by adjusting a temperature of the unit cell 10 to suppress degradation of the input/output characteristic of the unit cell 10.

The battery pack 1 of this embodiment has an upper case and a lower case, both of which are not shown, and, together with the guide section 50, the battery assembly 100 is arranged in a housing space that is surrounded by the upper case and the lower case. The air intake duct 401 that extends from the blower 400 is connected to the battery pack 1 in which the battery assembly 100 is housed in the housing space. The air that is supplied from the blower 400 circulates in the battery pack 1. The air that flows through the battery pack 1 is guided to the lateral surface 11c of the each unit cell 10 by the guide section 50. The air that has been guided to the lateral surface 11c exchanges heat with the unit cell 10 and is exhausted to the outside of the battery pack 1.

Figure 3:
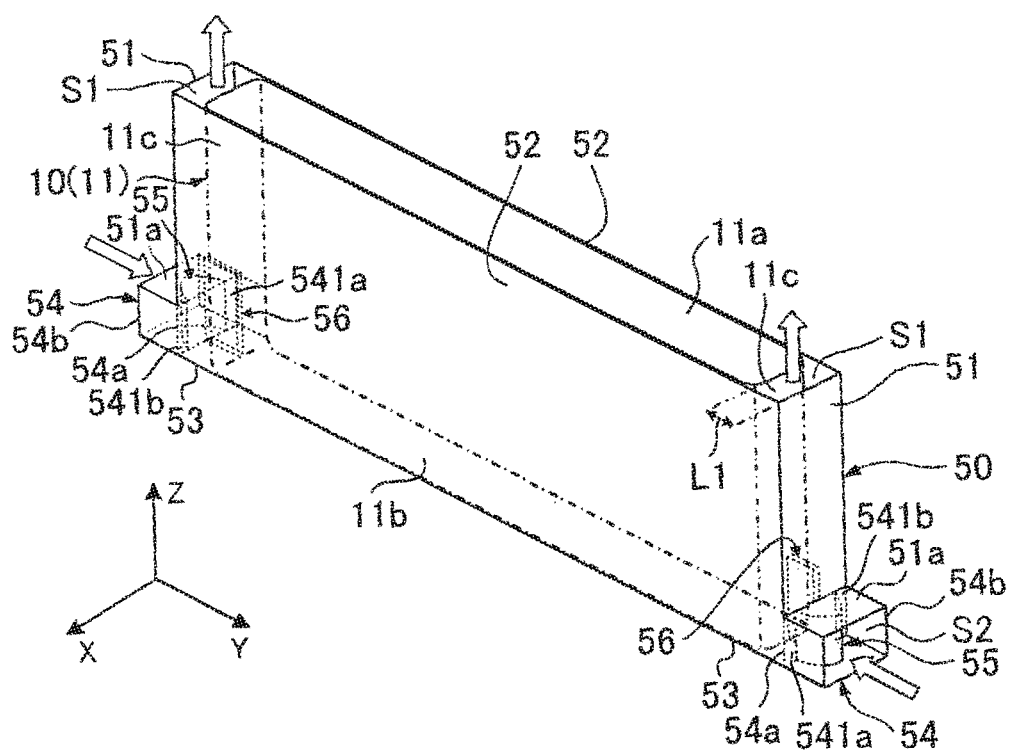
FIG. 3 is an exterior perspective view of a guide section that constitutes the temperature adjusting structure in the first embodiment.

FIG. 3 is an exterior perspective view of the guide section 50 of this embodiment. The guide section 50 is configured by including a first wall section 51, a second wall section 52, and a bottom section 53. The first wall section 51 forms a surface that opposes the lateral surface 11c of the unit cell 10 in the Y-direction, and extends in a longitudinal direction of the lateral surface 11c (the Z-direction). The two second wall sections 52 extend substantially in parallel with the stacking surface 11d of the unit cell 10 in the Y-direction. The bottom section 53 contacts the bottom surface 11b of the unit cell 10.

The heights of the first wall section 51 and the second wall section 52 are the same as the height H of the unit cell 10. The second wall sections 52 are provided to correspond with the two stacking surfaces 11d that are aligned in the stacking direction of the unit cell 10, and are each formed to extend to the outside in the Y-direction by a distance L1 from the lateral surface 11c that is positioned at the end of the stacking surface 11d in the Y-direction. The pair of second wall sections 52 is separated from each other by a distance that corresponds to the width D of the unit cell 10 (the case 11) in the X-direction. The first wall section 51 is provided at the end of the second wall section 52 that extends to the outside from the lateral surface 11c.

The second wall section 52 of this embodiment is formed to be longer than the length L of the stacking surface 11d of the unit cell 10 in the Y-direction by the length L1×2. The guide section 50 of this embodiment is formed in a shape that surrounds a periphery of the unit cell 10 other than the upper surface 11a, so that a space (a circulation path S1) in which the air circulates for the unit cell 10 is only formed between the lateral surface 11c and the first wall section 51.

In correspondence with the circulation path S1, the bottom section 53 is also formed to be longer than the length L of the stacking surface 11d of the unit cell 10 in the Y-direction by the length L1×2. An end of the circulation path S1 on the bottom surface 11b side of the unit cell 10 is closed by the bottom section 53, and an end thereof on the upper surface 11a side is opened as an exhaust port of the air.

The guide section 50 further includes a supply section 54 that supplies the air to the circulation path S1. The supply section 54 can be provided at one end of the circulation path S1 that is closed by the bottom section 53. The air that flows into the circulation path S1 from the supply section 54 is guided by the first wall section 51, flows toward the exhaust port of the circulation path S1, and is then exhausted. The exhaust port is an opening on the upper side of the circulation path S1 that is provided at another end of the circulation path S1. The upper side indicates the positive side in the Z-direction in the drawings.

As shown in FIG. 3, for example, the supply section 54 forms an air supply path S2 that extends in the Y-direction with respect to the circulation path S1 that extends in the Z-direction along the lateral surface 11c. The supply section 54 has an air inflow port 54a that communicates with the inside of the circulation path S1 and a connection port 54b that is connected to the air intake duct 401 (401a or 401b) that extends from the blower 400. The supply path S2 of the supply section 54 and the circulation path S1 are formed in a substantial L shape in a YZ plane view, and the air is supplied from the Y-direction to the circulation path S1 (the lateral surface 11c) in a substantially perpendicular manner.

The supply section 54 of this embodiment includes a vortex flow generating section 5 for generating a vortex flow in the air that flows into the circulation path S1, the vortex flow swirling with the longitudinal direction of the lateral surface 11c being a rotational axis. The vortex flow generating section 5 includes two blowoff ports 541a, 541b in the inflow port 54a, and generates the swirling vortex flow of the air by an air blowoff structure to the circulation path S1, the structure being configured by including the blowoff ports 541a, 541b.

Figure 4:
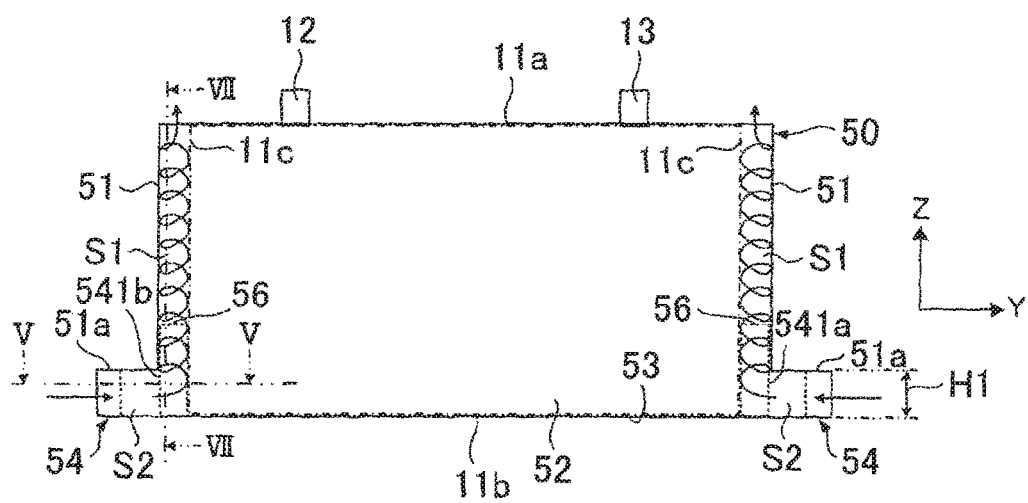
FIG. 4 is a front view of a unit cell that includes the guide section when seen in a stacking direction, and is a view for illustrating a temperature adjusting method of a lateral surface of the unit cell in the first embodiment.

FIG. 4 is a front view of the unit cell 10 that includes the guide section 50 when seen in the stacking direction, and is a view for illustrating a temperature adjusting method of the lateral surface 11c of the unit cell 10. As shown in FIG. 4, the supply section 54 supplies the air from the Y-direction to the circulation path S1 that extends in the Z-direction in the substantially perpendicular manner. A laminar flow of the air with a height H1 in the Z-direction flows into the circulation path S1 from the supply section 54 via the blowoff ports 541a, 541b. The air that flows into the circulation path S1 turns into the swirling vortex flow by the blowoff structure that is configured by the blowoff ports 541a, 541b with respect to the circulation path S1, and flows toward the exhaust port on the upper surface 11a side of the unit cell 10 while contacting the lateral surface 11c with the longitudinal direction of the lateral surface 11c being the rotational axis.

The supply section 54, for example, can be formed by extending a portion of each of the second wall section 52 and the bottom section 53 from the first wall section 51 to the outside in the Y-direction for a specified length. The outside is an opposite side from a side on which the unit cell 10 is positioned. Then, the supply path S2 can be formed by providing a wall section 51a in a position that corresponds to an upper end of each of the blowoff ports 541a, 541b in the Z-direction, the wall section 51a being projected in the Y-direction from the first wall section 51 in a substantially perpendicular manner.

Figure 5:
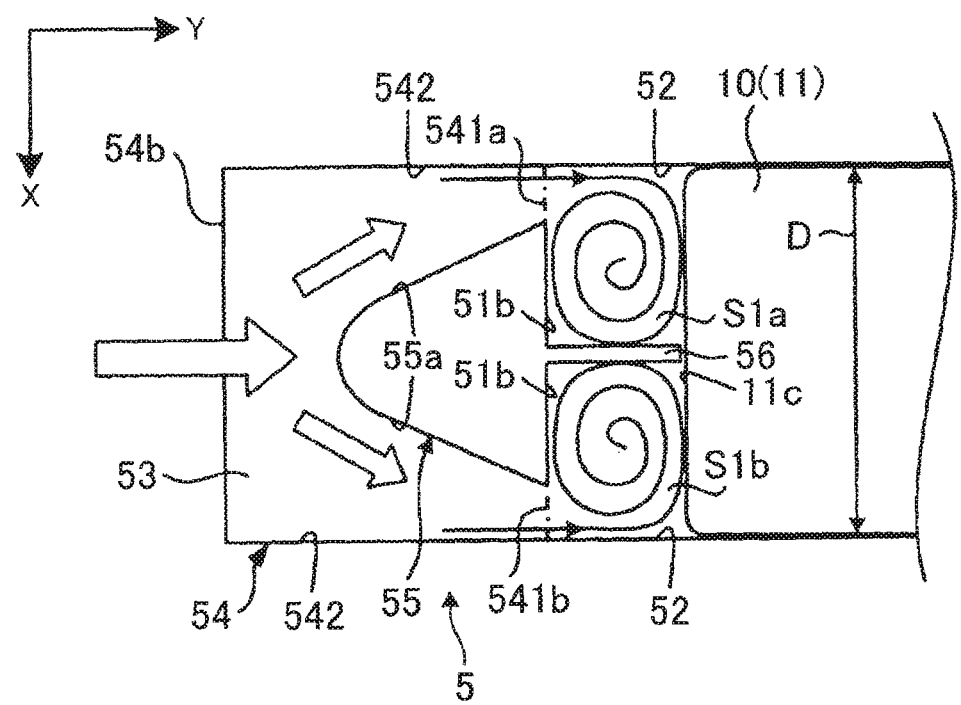
FIG. 5 is a cross-sectional view that is taken along V-V in FIG. 4 in the first embodiment.

FIG. 5 is a cross-sectional view that is taken along V-V in FIG. 4. As shown in FIG. 3 and FIG. 4, each of the blowoff ports 541a, 541b is a rectangular opening with the height H1 and a specified width in the X-direction from the end of the circulation path S1 on the bottom surface 11b side. The blowoff ports 541a, 541b constitutes the inflow port 54a from the supply path S2 to the circulation path S1. As shown in FIG. 5, a first guide surface 542 and a second guide surface 55a are provided to the upstream side of the supply path S2 to which the air is supplied from an opening end of each of the blowoff ports 541a, 541b.

The second wall section 52 that forms the supply path S2 of the supply section 54 can constitute the first guide surface 542. In order to form the supply path S2 as described above, the first guide surface 542 can be formed by extending the portion of the second wall section 52 to the outside in the Y-direction. Thus, the second wall section 52 can be used as the first guide surface 542 that guides the air to each of the blowoff ports 541a, 541b.

The second guide surface 55a is a surface that opposes the first guide surface 542 in the vortex flow generating section 5 in the X-direction. A guide member 55 forms the blowoff ports 541a, 541b as the inflow port 54a from the supply path S2 to the circulation path S1, and is configured as a branch section that branches the air flowing from the connection port 54b and guides the air to the two blowoff ports 541a, 541b that are separated in the X-direction. A surface in the branch section that opposes the first guide surface 542 in the X-direction serves as the second guide surface 55a. The second guide surface 55a is positioned on the inside in the X-direction (the width direction) of the lateral surface 11c from the first guide surface 542.

As in the example of FIG. 5, the guide member 55 of this embodiment is arranged between the pair of first guide surfaces 542 (542a, 542b) that forms the supply path S2 of the supply section 54, and can be formed in a shape that is projected to the upstream side of the supply path S2. For example, as in the example of FIG. 5, the guide member 55 can be formed in a trapezoidal shape that has a tapered and inclined surface, so that the air supply path is narrowed from the connection port 54b to the blowoff ports 541a, 541b of the supply section 54.

A surface that is in the same XZ plane as an opening surface of each of the blowoff ports 541a, 541b, that faces the inside of the circulation path S1, and opposes the lateral surface 11c is a guide surface 51b of the first wall section 51 that constitutes the circulation path S1. The guide surfaces 51b extend substantially parallel in the X-direction and divide the supply path S2 except the blowoff ports 541a, 541b from the circulation path S1. The guide surface 51b of the guide member 55 that is positioned in the same XZ plane as the first wall section 51 is arranged on the inside in the X-direction of the lateral surface 11c from the blowoff ports 541a, 541b. In other words, the guide surface 51b has a smaller width than the width D of the first wall section 51 in the X-direction, and each of the blowoff ports 541a, 541b is formed on both ends of the guide surface 51b in the X-direction.

The second guide surface 55a of the guide members 55 can be configured integrally to extend from the guide surface 51b to the upstream side of the supply path S2 that supplies the air to the circulation path S1. In this embodiment, on the one lateral surface 11c, the two swirling vortex flows are formed by the two blowoff ports 541a, 541b.

As shown in FIG. 5, a partition wall 56 is provided that divides the circulation path S1 in the X-direction along the longitudinal direction of the lateral surface 11c with respect to the blowoff ports 541a, 541b. The partition wall 56 can integrally be provided with the guide member 55, and extends from the guide surface 51b toward the lateral surface 11c.

Here, a description will be made on principle of generating the swirling vortex flow by the blowoff structure of this embodiment. As shown in FIG. 5, in the XY plan view, the circulation path S1 is divided into two paths S1a, S1b by the partition wall 56, and the blowoff ports 541a, 541b are respectively provided for the circulation paths S1a, S1b that are divided.

Figure 6:
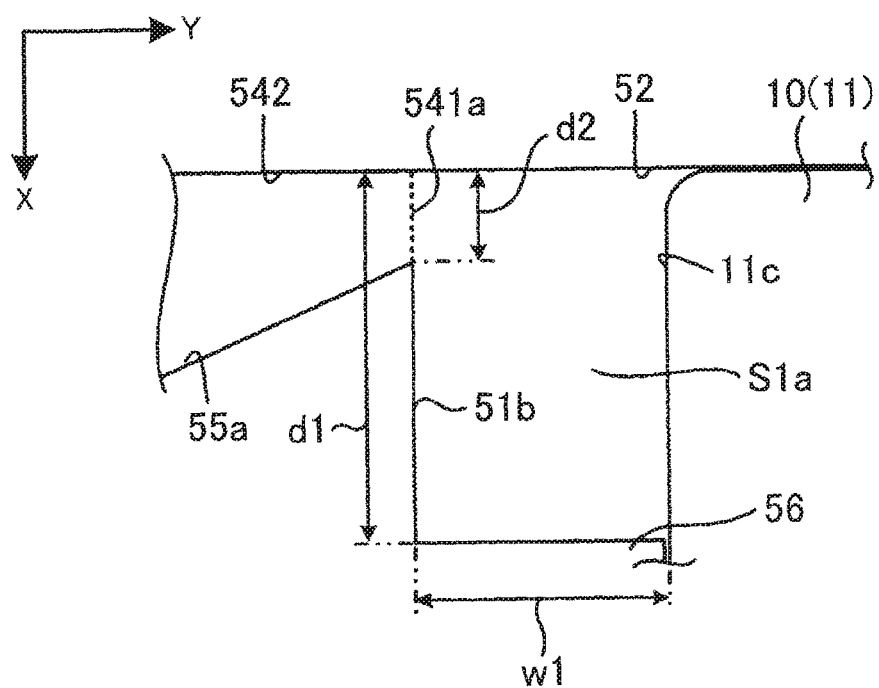
FIG. 6 is a view for illustrating a blowoff structure that generates a swirling vortex flow in the first embodiment.

FIG. 6 is a view for illustrating the blowoff structure that generates the swirling vortex flow, and is an enlarged view of the divided circulation path S1a and the blowoff port 541a. As shown in FIG. 6, the divided circulation path S1a is a space that has a length w1 in the Y-direction and a width d1 in the X-direction. The width d1 in the X-direction corresponds to a half of the width D of the lateral surface 11c, for example. The blowoff port 541a has a width d2 in the X-direction and is connected to the supply path S2 that is formed by the first guide surface 542 and the second guide surface 55a.

At this time, an opening of the blowoff port 541a is formed to have the width d2 that is smaller than the length w1 and the width d1 of the divided path S1a (d2<w1, d2<d1). Here, a magnitude relationship between the length w1 and the width d1 of the circulation path S1a is arbitrary.

In other words, as shown in FIG. 6, in the XY plan view, a flow path cross section (an opening surface) of the blowoff port 541a is formed to be smaller than a flow path cross section of the circulation path S1a, and the blowoff structure is formed in which the laminar flow of the air in the width d2 (and the height H1) flows into the circulation path S1a from the blowoff port 541a. The width d2 is smaller than the length w1 and the width d1 of the circulation path S1a.

Then, in the blowoff structure of this embodiment, in the lateral surface 11c, the first wall section 51 (51b), the second wall section 52 that form the circulation path S1a, the laminar flow with the height H1 in the Z-direction and the width d2 in the X-direction that is smaller than the width d1 in the X-direction and the length w1 in the Y-direction of the flow path cross section of the circulation path S1a in the Y-direction while the air flows into the circulation path S1a along the second wall section 52.

The laminar flow that flows from the blowoff port 541*a* along the second wall section 52 changes a direction thereof to the X-direction along the lateral surface 11*c* when reaching the lateral surface 11*c*, and then flows toward the partition wall 56. The laminar flow that has reached the partition wall 56 further changes the direction thereof to the Y-direction along the partition wall 56, and flows toward the guide surface 51*b* (the first wall section 51). The laminar flow that has reached the guide surface 51*b* flows toward the second wall section 52 along the guide surface 51*b*. Just as described, when the laminar flow of the air is swirled along an inner surface of the circulation path S1*a*, the swirling vortex flow can be generated that has the longitudinal direction of the lateral surface 11*c* as the rotational axis and has a cooling length in the X-direction of the lateral surface 11*c*.

The blowoff port 541*b* also has the same blowoff structure. In the lateral surface 11*c*, the first wall section 51 (51*b*), the second wall section 52, and the partition wall 56 that form the circulation path S1*b*, the laminar flow with the height H1 in the Z-direction and the width d2 in the X-direction flows into the circulation path S1*b* while the air flows into the circulation path S1*b* along the second wall section 52. The width d2 is smaller than the width d1 in the X-direction and the length w1 in the Y-direction of a flow path cross section of the circulation path S1*b* in the horizontal direction. The laminar flow of the air is swirled along an inner surface of the circulation path S1*b*, and the swirling vortex flow can thereby be generated that has the longitudinal direction of the lateral surface 11*c* as the rotational axis and has the cooling length in the X-direction of the lateral surface 11*c*.

Figure 7:
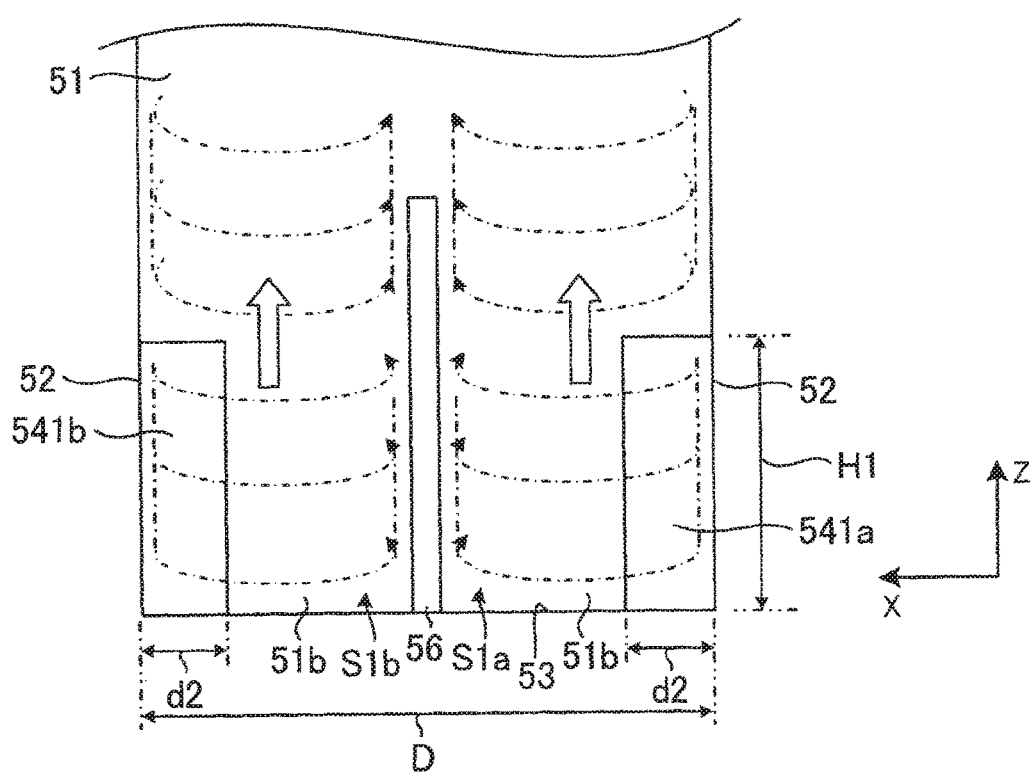
FIG. 7 is a cross-sectional view taken along VII-VII in FIG. 4 in the first embodiment.

FIG. 7 is a cross-sectional view taken along VII-VII in FIG. 4. As shown in FIG. 7, the laminar flows of the air that are blown off from the blowoff ports 541*a*, 541*b* with the height H1 in the Z-direction and the width d2 in the X-direction to the circulation paths S1*a*, S1*b* form the independent swirling vortex flows that are divided by the partition wall 56. The two swirling vortex flows with the Z-direction being the rotational axis are formed with respect to the width D of the lateral surface 11*c* in the X-direction.

Here, as in an example of FIG. 7, the partition wall 56 is higher than the height H1 of each of the blowoff ports 541*a*, 541*b* in the longitudinal direction of the lateral surface 11*c* and does not extend to the end of the circulation path S1 in the Z-direction. A height of the partition wall 56 can be set arbitrarily such that the laminar flows of the air blown off from the two blowoff ports 541*a*, 541*b* are not mixed with each other and thus form the swirling vortex flows that are independent of each other. Here, the partition wall 56 can be provided that extends to the end of the circulation path S1 in the Z-direction to have the height H.

The swirling vortex flow that is generated by each of the blowoff ports 541*a*, 541*b* swirls with the longitudinal direction of the lateral surface 11*c* (the Z-direction) being the rotational axis, has a first cooling length (D/2) that is the width direction orthogonal to the longitudinal direction of the lateral surface 11*c*, flows in the Z-direction along the longitudinal direction of the lateral surface 11*c* while contacting the lateral surface 11*c*.

Accordingly, since the air in the vortex flow that flows while swirling has the first cooling length in the X-direction and contacts the lateral surface 11*c*, the cooling length can be reduced in comparison with a case where the air flows along the longitudinal direction of the lateral surface 11*c*. Thus, the temperature adjustment can be performed efficiently. Furthermore, the swirling vortex flow that advances in the longitudinal direction of the lateral surface 11*c* also advances a second cooling length that extends in the longitudinal direction of the lateral surface 11*c* (the Z-direction) while swirling in the X-direction. Thus, it is possible to disturb a temperature boundary layer in a length direction of the second cooling length, to suppress an increase in the temperature boundary layer along the longitudinal direction of the lateral surface 11*c*, and thus to efficiently perform the temperature adjustment.

Particularly, instead of the vortex flow that is produced by turbulence, the vortex flow generating section 5 (the blowoff ports 541*a*, 541*b*) of this embodiment swirls the laminar flow that has the height H1 in the Z-direction and the width d2 in the X-direction to form the vortex flow. Since the swirling vortex flow that has the longitudinal direction of the lateral surface 11*c* as the rotational axis and has the cooling length in the X-direction of the lateral surface 11*c* is generated, the heat exchange between the lateral surface 11*c* and the air can be performed efficiently.

As described above, with the temperature adjusting structure of this embodiment, the temperature of the lateral surface 11*c* of the case 11 of the unit cell 10 can efficiently be adjusted without bringing the air into contact with a space between the stacked unit cells 10. Thus, the battery pack 1 can be downsized in the X-direction (the direction in which the unit cells 10 are aligned). In addition, since the air supply path to the guide section 50 is positioned on the lateral surface of the battery pack 1, the battery pack 1 can also be downsized in the Z-direction (the height). In this embodiment, as in the example of FIG. 7 and the like, the two swirling vortex flows with the rotational axis in the Z-direction are produced in the X-direction (the width direction) of the lateral surface 11*c*. Accordingly, the first cooling length of the each swirling vortex flow in the X-direction of the lateral surface 11*c* is halved, and thus the temperature adjustment can be performed further efficiently.

In addition, by the guide section 50, the temperature adjusting air that is supplied from the blower 400 is suctioned and exhausted in parallel (independently) with respect to the lateral surface 11*c* of each of the unit cells 10 that constitute the battery assembly 100. Thus, cooling air on the downstream side is not influenced by the temperature increase of cooling air on the upstream side. Therefore, the cooling efficiencies of the unit cells 10 on the upstream side and the downstream side can be equalized, and thus variations in temperature between the unit cells 10 can be suppressed.

Figure 8:
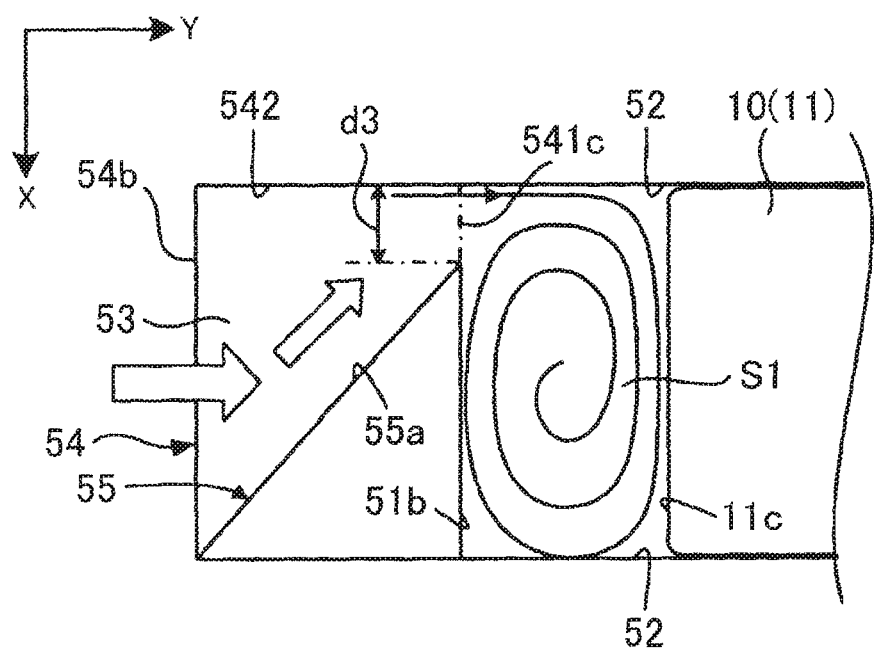
FIG. 8 is a view of a first modified example of a vortex flow generating section in the first embodiment.
Figure 9:
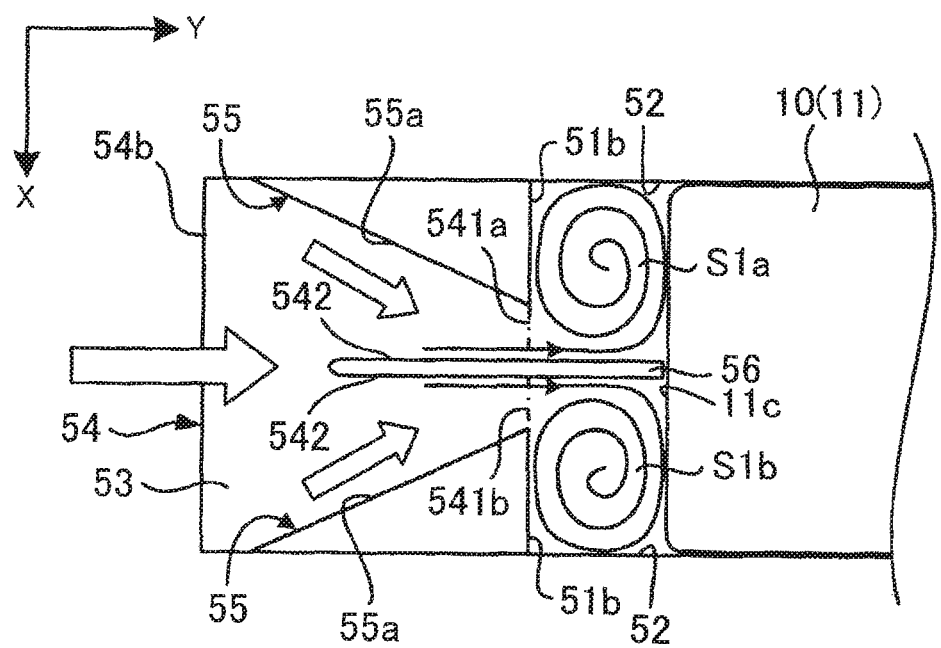
FIG. 9 is a view of a second modified example of the vortex flow generating section in the first embodiment.

FIG. 8 and FIG. 9 show modified examples of the blowoff structure of the temperature adjusting structure of this embodiment. An example of FIG. 8 is a blowoff structure in which the circulation path S1 is not divided by the partition wall 56, in which one blowoff port 541*c* is provided for the circulation path S1, and in which the laminar flow swirls with the longitudinal direction of the lateral surface 11*c* (the Z-direction) being the rotational axis, has the first cooling length that is the width D orthogonal to the longitudinal direction of the lateral surface 11*c*, contacts the lateral surface 11*c* while flowing in the Z-direction along the longitudinal direction of the lateral surface 11*c*.

Also in the modified example in FIG. 8, as shown in FIG. 6, a blowoff port 541*c* is formed to have an opening that has a smaller width d3 than a length (w1×2) and the width (d1×2) of the flow path cross section of the circulation path S1 in the XY plane. The laminar flow of the air with the height H1 in the Z-direction and the width d3 in the X-direction flows into the circulation path S1 along the second wall section 52 of the lateral surface 11*c*, the first wall section 51 (51*b*), and the second wall section 52 that form the circulation path S1. Accordingly, the laminar flow of the air swirls along the inner surface of the circulation path S1, and thus the swirling vortex flow can be generated with the longitudinal direction of the lateral surface 11*c* being the rotational axis and that has the cooling length in the X-direction of the lateral surface 11*c*.

Next, the modified example shown in FIG. 9 is an example of the blowoff structure in which the laminar flow of the air flows into the circulation paths S1*a*, S1*b* from the blowoff ports 541*a*, 541*b* along the partition wall 56 that divides the circulation path S1.

As described above, the circulation path S1*a* is surrounded by the lateral surface 11*c*, the first wall section 51 (51*b*), the second wall section 52, and the partition wall 56. Thus, the partition wall 56 is extended to the upstream side of the supply path S2 from the first wall section 51*b*, and the blowoff port 541*a* can be formed on the partition wall 56 side.

In other words, in the example of FIG. 9, a positional relationship between the blowoff ports 541*a*, 541*b* with respect to the circulation paths S1*a*, S1*b* that are shown in FIG. 5 and divided by the partition wall 56 is that the blowoff ports 541*a*, 541*b* are arranged to be adjacent to each other with the partition wall 56 being interposed therebetween in the X-direction. In a case where the partition wall 56 corresponds to the second wall section 52 of the blowoff structure that is shown in FIG. 5 and where the circulation path S1 is divided by the partition wall 56, the second wall section 52 that covers the space between the lateral surface 11*c* and the first wall section 51 in the circulation path S1*a* is configured by including a portion that is extended by the length L1 in the Y-direction and the partition wall 56.

As described above, in the modified example of FIG. 9, the laminar flow with the height H1 in the Z-direction and the width d2 in the X-direction flows into the circulation path S1*a* while the air flows into the circulation path S1*a* along the partition wall 56. The width d2 is smaller than the width d1 in the X-direction and the length w1 in the Y-direction in the flow path cross section in the Y-direction of the circulation path S1*a*. With such a structure, the laminar flow of the air swirls along the inner surface of the circulation path S1*a*, and thus the swirling vortex flow can be generated with the longitudinal direction of the lateral surface 11*c* being the rotational axis and that has a half of the first cooling length in the X-direction of the lateral surface 11*c*. The same can be said for the blowoff port 541*b*.

In this embodiment, the rectangular circulation path S1 has been described as the example. However, the shape of the circulation path S1 is not limited thereto. For example, the circulation path may have an arcuate shape in which a cross-sectional shape in the XY plane has a curve. In addition, the first guide surface 542 and the second guide surface 55*a* can each be configured as a guide surface that is substantially parallel to the Y-direction for each of the blowoff ports 541*a*, 541*b*. In other words, it may be configured to provide the supply path S2 that has the same width as the opening of each of the blowoff ports 541*a*, 541*b* and extends to the outside in the Y-direction. In addition, the first guide surface 542 can be provided in a manner to be tilted to the outside in the X-direction with respect to the second wall section 52.

The supply section 54 and the guide member 55 can be formed as separate components from the circulation path S1. In this case, for example, the inflow port 54*a* that is formed with the blowoff ports 541*a*, 541*b* is formed in the first wall section 51, and the supply section 54 and the guide member 55 that has the guide surface 51*b* are connected to the inflow port 54*a*. Thus, the blowoff structure by the blowoff ports 541*a*, 541*b* can be formed.

The blowoff ports 541*a*, 541*b* can be provided in the second wall section 52. In other words, the supply path S2 can be connected to the circulation path S1 so as to supply the air in a direction that is substantially parallel to the Y-direction to the circulation path S1. In this case, the laminar flow of the air that flows into the circulation path S1 via the blowoff ports 541*a*, 541*b* flows into the circulation path S1 along the guide surface 51*b* (the first wall section 51) or the lateral surface 11*c*.

In the guide section 50 of this embodiment, the pair of second wall sections 52 is provided to correspond to the two stacking surfaces 11*d* of the one unit cell 10, and the circulation path S1 that extends in the longitudinal direction of the lateral surface 11*c* is closed by the two second wall sections 52 of the guide section 50. However, the circulation path S1 that extends in the longitudinal direction of the lateral surface 11*c* can be formed by using the second wall section 52 of the guide section 50 in the other adjacent unit cell 10 in the X-direction.

For example, in the example of FIG. 3, the second wall section 52 of the guide section 50 that is provided to correspond to the each adjacent unit cell 10 is arranged to be doubled between the two adjacent unit cells 10 that are stacked in the X-direction. However, the guide section 50 can be configured such that one of the two second wall sections 52 is removed and that the first wall section 51 is formed at both ends in the Y-direction of the one second wall section 52 that extends substantially parallel to the stacking surface 11*d* of the unit cell 10 in the Y-direction.

In this case, the second wall section 52 of the guide section 50 in the one unit cell 10 that is stacked in the X-direction while being sandwiched between the unit cells 10 is arranged on the stacking surface 11*d* of the other unit cell 10 that is adjacent in the X-direction. Thus, the one unit cell 10 and the other unit cell 10 that are adjacent in the stacking direction are tightly arranged with the single second wall section 52 being interposed (sandwiched) therebetween. Then, the space between the lateral surface 11*c* of the one unit cell 10 and the first wall section 51 can be configured to be closed in the X-direction by the second wall section 52 of the guide section 50 and the second wall section 52 of the guide section 50 in the other unit cell 10 that is adjacent in the X-direction. Thus, it is possible to form the circulation path S1 that extends in the longitudinal direction of the lateral surface 11*c*.

The bottom section 53 of this embodiment may not have the shape that covers the entire bottom surface 11*b* of the unit cell 10. For example, the bottom section 53 that is extended to the outside from the end of the bottom surface 11*b* in the Y-direction by the length L1 and that corresponds to the each lateral surface 11*c* can be provided to at least close the end of the bottom surface 11*b* in the unit cell 10 that corresponds to the circulation path S1. In addition, the second wall section 52 can be formed to be higher than the height H of the unit cell 10, so as to protrude from the upper surface 11*a* of the unit cell 10 in the Z-direction. With such a configuration, an insulation property between the unit cells 10 can further be improved.

The plural guide sections 50 that are provided for the each unit cell 10 can be configured integrally. More specifically, the plural guide sections 50 of this embodiment can be provided in the stacking direction, so as to correspond to the plural unit cells 10 that constitute the battery assembly 100.

In addition, the plural guide sections that are provided in the stacking directions can be configured integrally.

FIG. 10 to FIG. 19 depict the second embodiment of the present invention. This embodiment further includes a temperature adjusting structure of the bottom surface 11b of the case 11, in addition to the temperature adjusting structure of the lateral surface 11c of the first embodiment described above. This embodiment performs the temperature adjustment by bringing the air into contact with the bottom surface 11b and the lateral surface 11c of the unit cell 10 that constitutes the battery assembly 100.

Figure 10:
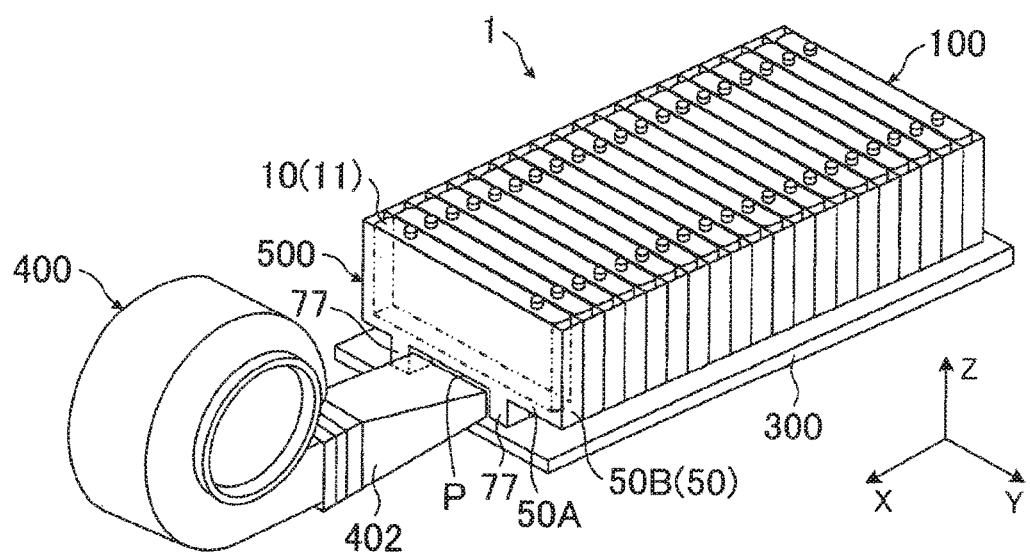
FIG. 10 is a schematic perspective view of an example of a battery pack that includes temperature adjusting structures of a lateral surface and a bottom surface of a battery assembly (a unit cell) in a second embodiment.

FIG. 10 is a schematic perspective view of the temperature adjusting structure of the battery pack 1 of this embodiment. A guide section 500 is configured by including: a first guide section 50A that is arranged between the bottom surface (lower surface) side of the battery assembly 100 and a lower case 300; and a second guide section 50B that is provided on the lateral surfaces on both sides in the Y-direction (the horizontal direction) when the battery assembly 100 is seen in the X-direction in which the unit cells 10 are aligned.

In this embodiment, the second guide section 50B corresponds to the example of the guide section 50 in the above first embodiment. In the following description, the second guide section 50B is denoted with the same reference numerals as those indicated by the each drawing in the first embodiment, and a description thereof will not be made. In addition, for the guide section 500 of this embodiment, an aspect in which the first guide section 50A and the second guide section 50B are configured integrally is illustrated as an example. However, the guide section 500 can be configured by combining the separate guide sections.

The blower 400 can be arranged adjacently to the battery assembly 100 in the X-direction. An air intake duct 402 that is connected to the outlet port of the blower 400 is connected to an air intake path P on the bottom surface side of the battery assembly 100 that is formed by the first guide section 50A. The air intake path P extends in the X-direction. The blower 400 may not be arranged in alignment with the battery assembly 100 in the X-direction. For example, the blower 400 may be aligned in the Y-direction. In this case, the blower 400 can be formed in an arbitrary shape such that the outlet port of the blower 400 and the air intake duct 402 are connected to an end of the air intake path P that extends in the X-direction.

Figure 11:
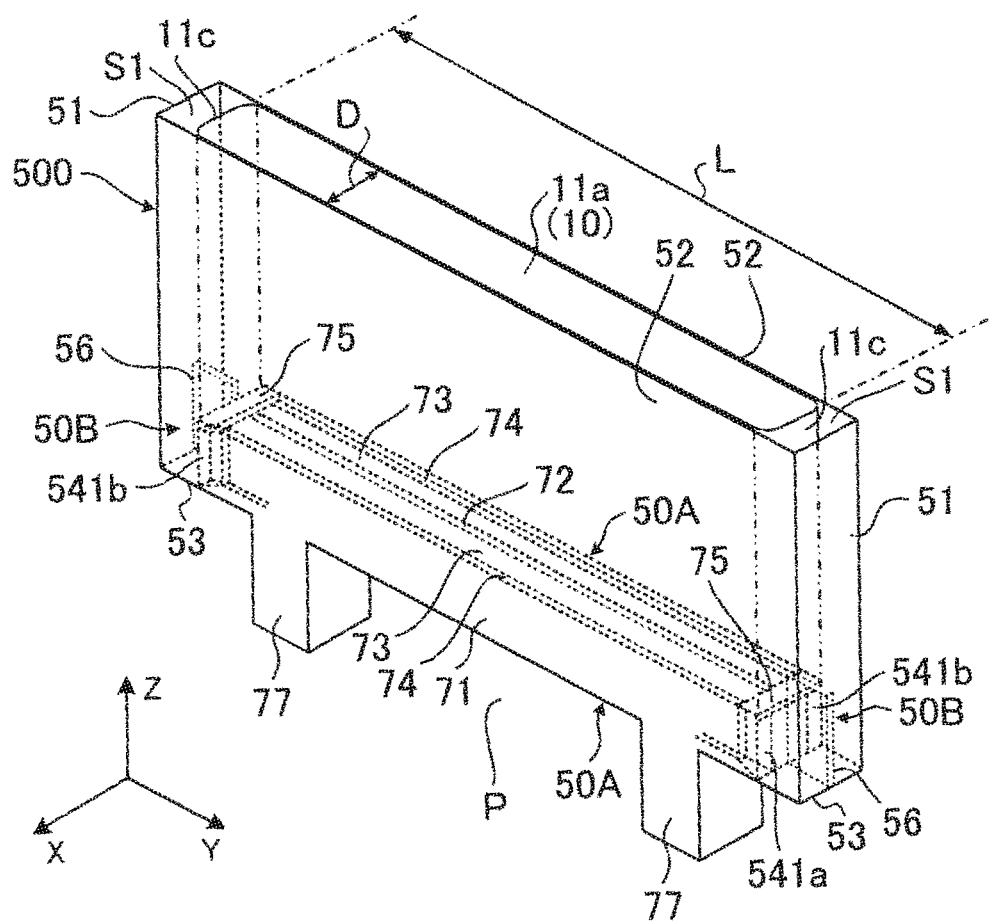
FIG. 11 is an exterior perspective view of the unit cell and a guide section in the second embodiment.

FIG. 11 is a view of an example of the guide section 500 of this embodiment. The guide section 500 of this embodiment is provided for the each unit cell 10 that constitutes the battery assembly 100. In the example of FIG. 10 and the like, the plural guide sections 500, each of which is provided for the each unit cell 10, are separately provided. However, the guide sections 500 can be provided integrally.

As shown in FIG. 11, the first guide section 50A that constitutes the guide section 500 has the substantially same width as the width D of the bottom surface 11b of the unit cell 10, and is formed to be long, so as to correspond to the length L of the unit cell 10 (the bottom surface 11b) in the Y-direction. The guide section 50A includes a guide section body 71 that is provided on the bottom surface 11b side and a pair of legs 77 that is arranged between the guide section body 71 and the lower case 300.

The leg 77 extends from the guide section body 71 toward the lower case 300, and an end thereof contacts an upper surface of the lower case 300. The leg 77 can be provided integrally with or independent of the guide section body 71. The leg 77 defines a space between the lower case 300 and the guide section body 71 in which the air circulates. The paired legs 77 are arranged to be separated for a specified distance in the Y-direction. The space between the paired legs 77 serves as the air intake path P of the temperature adjusting air that circulates in the X-direction of the unit cell 10 (the battery assembly 100).

Figure 12:
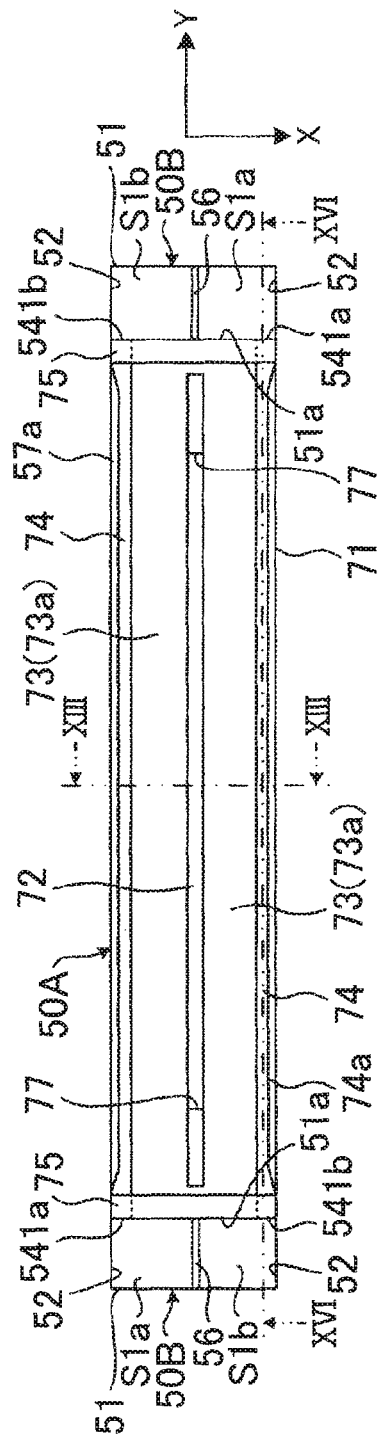
FIG. 12 is a top view of the guide section in the second embodiment.
Figure 13:
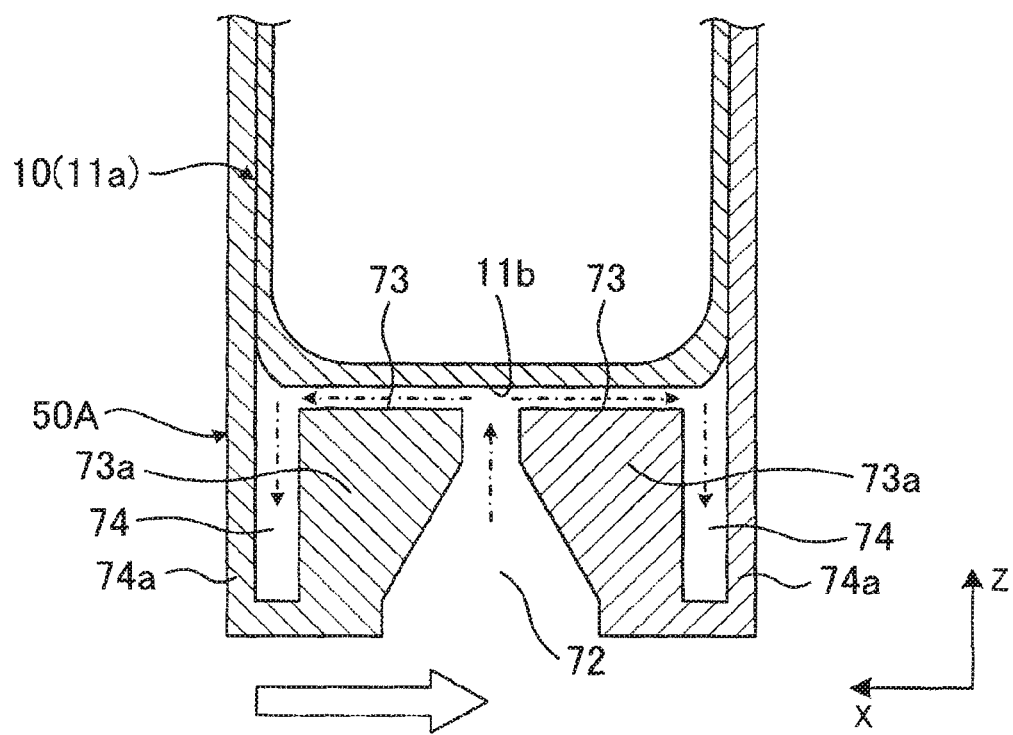
FIG. 13 is a cross-sectional view that is taken along XIII-XIII in FIG. 12 in the second embodiment.

FIG. 12 is a top view of the guide section 500. FIG. 13 is a cross-sectional view that is taken along XIII-XIII in FIG. 12. The guide section body 71 includes a supply path 72, a guide surface 73, a discharge path 74, and a mounting surface 75. The supply path 72 supplies the air to the bottom surface 11b of the each unit cell 10 that constitutes the battery assembly 100. The guide surface 73 guides the air that is supplied from the supply path 72 to the outside of the unit cell 10 along the bottom surface 11b in the X-direction. The discharge path 74 is a path that discharges the air that has exchanged the heat with the bottom surface 11b. The mounting surface 75 is a surface that at least a portion of the bottom surface 11b contacts.

The mounting surface 75 is provided on an upper surface of the guide section body 71 and serves as a region that a portion of an end of the bottom surface 11b of the unit cell 10 in the Y-direction contacts. The mounting surface 75 is provided at a position at an end of the upper surface of the guide section body 71 in the Y-direction that corresponds to the each end of the bottom surface 11b (see FIG. 14).

The supply path 72 is a path to guide the air that flows through the air intake path P to the bottom surface 11b, the air intake path P being formed by the paired legs 77. The supply path 72 can be formed by a pair of separated wall sections 73a, and is a path that is inserted in the guide section body 71 in the Z-direction from the air intake path P toward the bottom surface 11b. The supply path 72 extends in the Y-direction and has the substantially same length as the bottom surface 11b.

The guide surface 73 is a surface that opposes the bottom surface 11b, and is an upper surface of the wall section 73a that is positioned below the bottom surface 11b in the Z-direction. The guide surfaces 73 are provided with the supply path 72 that extends in the Y-direction being interposed therebetween in the X-direction. As shown in FIG. 13, the supply path 72 is provided near the center of the bottom surface 11b in the X-direction, and the air guided from the supply path 72 that extends in the Y-direction to the bottom surface 11b is guided by the guide surface 73 to both sides of the bottom surface 11b in the X-direction.

The guide surface 73 has the substantially same length as the supply path 72 that extends in the Y-direction, and has a width that corresponds to the width D of the bottom surface 11b in the X-direction. In this embodiment, the temperature adjustment of the unit cell 10 is performed by bringing the air that is guided from the supply path 72 into contact with the bottom surface 11b that is long in the Y-direction along the width direction in which the width of the bottom surface 11b is shorter than the length thereof.

In other words, the air that has a width of the length L with respect to the bottom surface 11b of the unit cell 10 is supplied from the supply path 72 and flows in the width direction of the bottom surface 11b. Accordingly, the uniform air flow with the length L flows along the bottom surface 11b in the X-direction and contacts the bottom surface 11b. Thus, the cooling length is shorter than a case where the air flows through a length direction of the bottom surface 11b in the Y-direction, and the cooling efficiency is improved.

The discharge path 74 is a path to discharge the air that exchanges the heat with the bottom surface 11b, and is formed by the wall section 73a and a wall section 74a that are separated from each other. The discharge path 74 is provided at a position that is adjacent to the supply path 72 in the X-direction in a manner to be divided from the supply path 72 by the wall section 73a. The discharge path 74 of the first guide section 50A is connected to the supply path 72 via the guide surface 73, and two of the discharge paths 74 are arranged on both sides in the X-direction.

The guide surface 73 guides the air, which has flown into the bottom surface 11b from the supply path 72 and that has exchanged the heat with the bottom surface 11b, along the bottom surface 11b toward the discharge path 74 that is adjacent to the supply path 72 in the X-direction. At this time, the supply path 72 and the discharge path 74 are divided by the wall section 73a, a lower side of the discharge path 74 in the Z-direction is closed by the wall section 74a and is divided from the air intake path P.

The discharge path 74 is connected to the circulation path S1 in the second guide section 50B at the each end in the Y-direction. In other words, in the guide section 500 of this embodiment, the second guide section 50B is provided at both end sides of the first guide section 50A in the Y-direction in a manner to correspond to the lateral surface 11c of the unit cell 10.

The second guide section 50B uses the discharge path 74 as a supply path (S2) of the air and let the air that has exchanged the heat with the bottom surface 11b flow into the circulation path S1 that extends in the Z-direction in the lateral surface 11c of the unit cell 10. The discharge path 74 is connected to each of the right and left second guide sections 50B at the ends in the Y-direction, and openings of the discharge path 74 at ends in the Y-direction are configured as the blowoff ports 541a, 541b for the circulation path S1.

Here, a positional relationship between the guide surface 73 and the mounting surface 75 of the guide section body 71 will be described. As shown in FIG. 11, the guide surface 73 is positioned lower than the mounting surface 75 that contacts the bottom surface 11b of the unit cell 10 in the Z-direction, and the space through which the air flows in the X-direction is formed between the bottom surface 11b and the guide surface 73. Thus, a step is formed between the mounting surface 75 and the guide surface 73 in the Z-direction, and the mounting surface 75 is provided in a region at the end of the guide surface 73 in the Y-direction.

As shown in FIG. 13, the supply path 72 of this embodiment can be formed in a nozzle shape. More specifically, the supply path 72 can be formed such that a width of the path that extends in the Z-direction toward the bottom surface 11b (a width in the X-direction) is narrowed as approaching the bottom surface 11b. Since the supply path 72 is formed in the nozzle shape from the air intake path P toward the bottom surface 11b of the unit cell 10, a flow rate of the air that is supplied to the bottom surface 11b can be increased, and the air can be supply to hit the bottom surface 11b. With such a configuration, the heat exchange of the air that contacts the bottom surface 11b is promoted, and thus the cooling efficiency is improved. Here, a width of a tip of the nozzle, that is, a width of an opening of the supply path 72 in the X-direction that faces the bottom surface 11b can arbitrarily be set.

Figure 14:
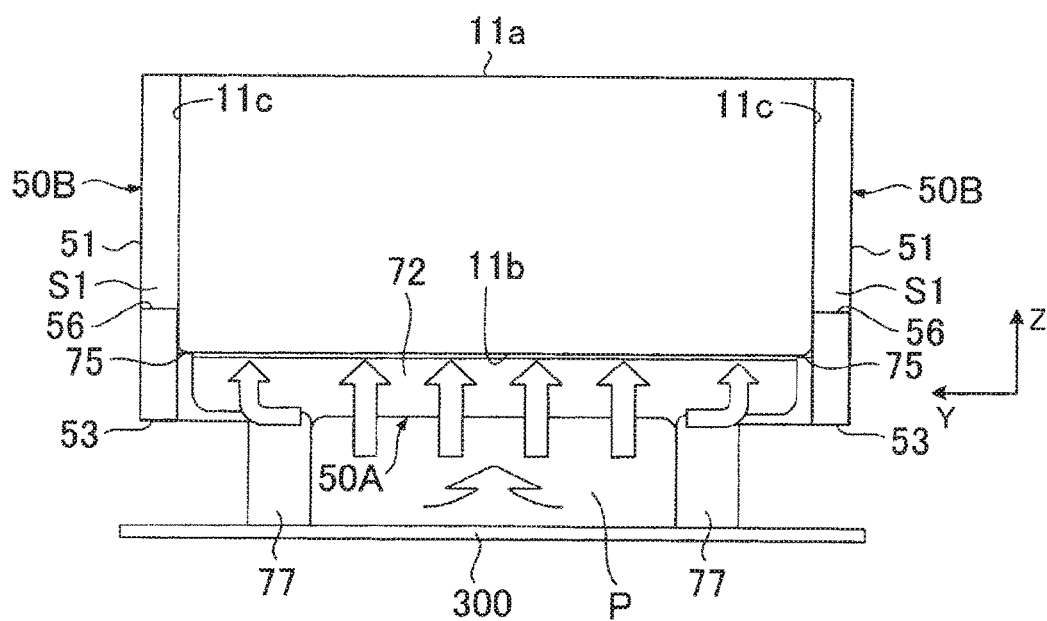
FIG. 14 shows an example of an aspect in which the air is suctioned for a bottom surface of the unit cell by a first guide section in the second embodiment.

Next, the flow of the air in the temperature adjusting structure of the first guide section 50A will be described. FIG. 14 shows an example of an aspect in which the air is suctioned for the bottom surface 11b of the unit cell 10 by the first guide section 50A. The air that is supplied from the blower 400 flows in the X-direction through the air intake path P that is formed by the paired legs 77 and the lower case 300. The air that has flown through the air intake path P in the X direction flows upward in the Z-direction from the air intake path P and contacts the bottom surface 11b substantially perpendicularly in the Z-direction, the bottom surface 11b being planar in the X-direction.

Figure 15:
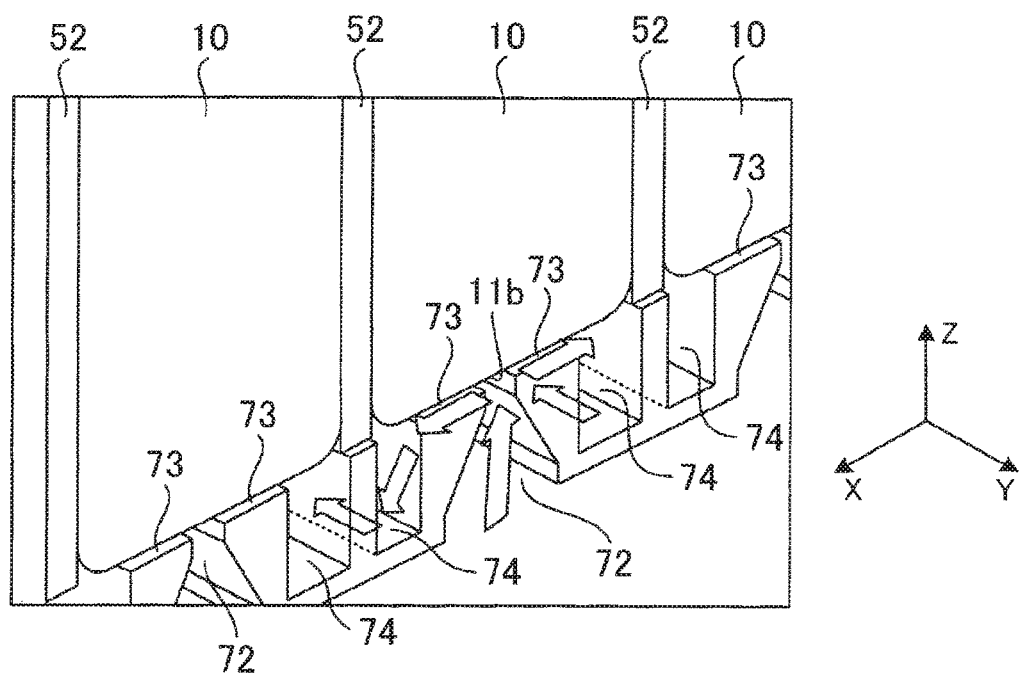
FIG. 15 is a view of the temperature adjusting structure of the bottom surface of the battery assembly (the unit cell) in the second embodiment.

FIG. 15 is a view of an aspect in which the air flowing through the air intake path P is guided to the each unit cell 10 that constitutes the battery assembly 100 by the first guide section 50A.

Since the guide section 500 is provided for each of the unit cells 10 in the battery assembly 100 that are aligned in the X-direction, the air that flows in the X-direction flows into each of the supply paths 72 that is positioned above the air intake path P in the Z-direction in parallel by the first guide section 50A. Thus, temperatures of the air on the upstream side and the downstream side of the air intake path P become the same, and the air that flows into the supply path 72 on the downstream side of the air intake path P is not influenced by the air that is heated by the heat exchange with the unit cell 10 on the upstream side.

The supply path 72 is opened to the bottom surface 11b of the unit cell 10 and guides the air to the bottom surface 11b in the substantially perpendicular direction. As shown in FIG. 15, the air flows upward in the Z-direction from the air intake path P and contacts the bottom surface 11b substantially perpendicularly in the Z-direction, the bottom surface 11b being planar in the X-direction.

The air that has contacted the bottom surface 11b substantially perpendicularly changes a direction thereof at approximately 90 degrees and flows through the spaces between the guide surfaces 73 on both of the sides of the supply path 72 in the X-direction and the bottom surface 11b in the width direction of the bottom surface 11b. The air that has flown through the bottom surface 11b in the width direction by the guide surface 73 and that has the length L in the Y-direction is guided to the discharge path 74 that is provided on both of the sides of the supply path 72 in the X-direction via the guide surface 73.

Figure 16:
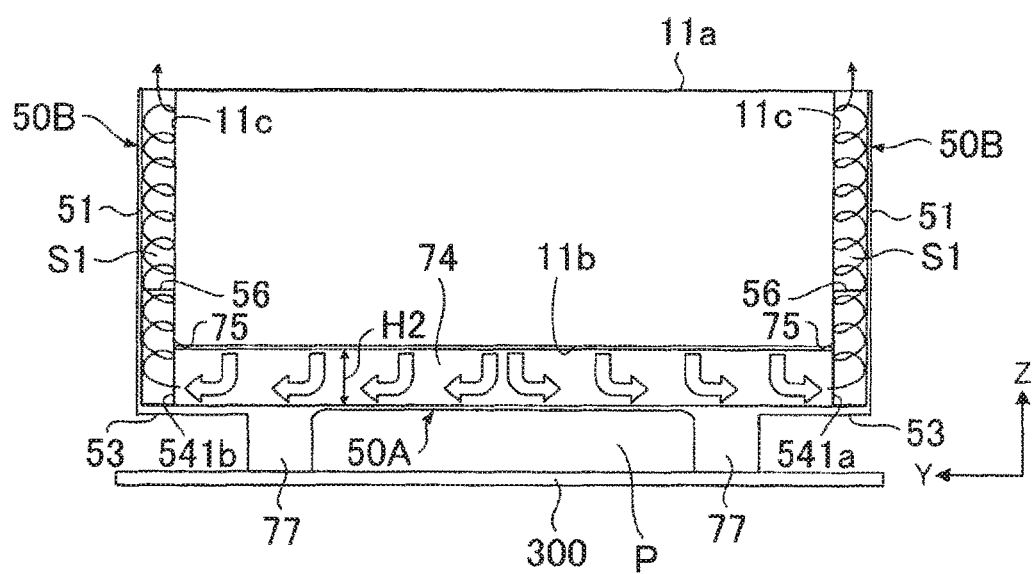
FIG. 16 is a cross-sectional view that is taken along XVI-XVI in FIG. 12 and illustrates a flow of the air from the temperature adjusting structure of the bottom surface of the battery assembly (the unit cell) to the temperature adjusting structure of the lateral surface in the second embodiment.

FIG. 16 shows an example of an aspect in which the air that has contacted the bottom surface 11b of the unit cell 10 is discharged by the discharge path 74 and flows into the circulation path S1 in the second guide section 50B. As shown in FIG. 16, the air that flows into the discharge path 74 from the guide surface 73 flows downward in the Z-direction with respect to the guide surface 73 and flows toward the end of the unit cell 10 in the Y-direction (on the outside in the Y-direction). Since the circulation path S1 of the air for the lateral surface 11c is provided at the end of the discharge path 74 in the Y-direction, the air that is discharged from the first guide section 50A flows through the discharge path 74 and then flows into the circulation path S1.

As described above, in this embodiment, the air is suctioned for the bottom surface of the unit cell 10 substantially perpendicularly. In other words, the air is suctioned in the Z-direction with respect to the bottom surface 11b of the unit cell 10. Furthermore, the air is discharged downwardly in the Z-direction with respect to the bottom surface 11b. A direction that is downward in the Z-direction is a negative direction of Z in the drawings. In the first guide section 50A, the supply path 72, the guide surface 73, and the discharge path 74 are provided to correspond with the bottom surface 11b for the each unit cell 10, and thus the first guide section 50A allows the intake and discharge of the air for the temperature adjustment of the unit cell 10 to be performed by the one bottom surface 11b.

In other words, in this embodiment, the air is suctioned substantially perpendicularly in the Z-direction with respect to the bottom surface 11*b* of the unit cell 10, and the air flows downwardly in the Z-direction with respect to the bottom surface 11*b* and is discharged in the Y-direction. Thus, the intake and discharge of the air is completed for the one bottom surface 11*b*.

The discharge path 74 of the first guide section 50A communicates with the circulation path S1 of the second guide section 50B that is provided on the lateral surface 11*c*, and the air that flows through the discharge path 74 is discharged from the exhaust port that is located above the lateral surface 11*c* in the Z-direction through the circulation path S1 that serves as an exhaust path.

The air that is guided to the bottom surface 11*b* of the unit cell 10 flows into the circulation path S1 that is divided in a manner not to contact the air that flows through the air intake path P. Accordingly, the intake and discharge of the air can be configured as being independent for the each unit cell 10. Thus, the air that is guided to the bottom surface 11*b* of the unit cell 10 on the downstream side of the air intake path P has the substantially same temperature as the air that is guided to the bottom surface 11*b* of the unit cell 10 on the upstream side, for example. The temperature adjusting air that is supplied from the blower 400 is suctioned and discharged in parallel (separately) for the bottom surface 11*b* of the each unit cell 10 that constitutes the battery assembly 100.

Figure 17:
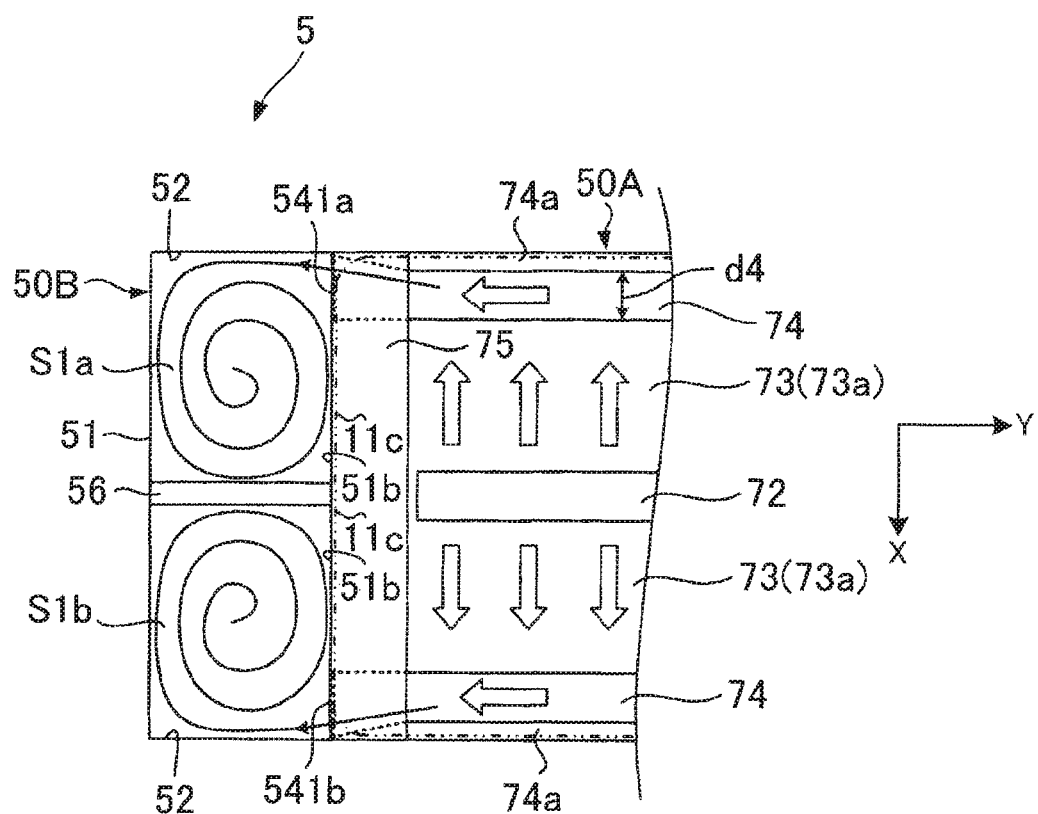
FIG. 17 illustrates the temperature adjusting structure in which the air supplied (exhausted) from the first guide section turns into a swirling vortex flow by a second guide section in the second embodiment.

FIG. 17 illustrates the temperature adjusting structure of the second guide section 50B with the discharge path 74 serving as a supply path S2. As shown in FIG. 17, the end of the discharge path 74 in the Y-direction communicates with the circulation path S1, and the opening of the discharge path 74 is configured as each of the blowoff ports 541*a*, 541*b* with respect to the circulation path S1.

Each of the blowoff ports 541*a*, 541*b* that is formed as the opening at the end of the discharge path 74 in the Y-direction is provided on a lateral surface at the end of the first guide section 50A in the Y-direction, and is formed as the opening whose size corresponds to a width d4 in the X-direction and a height H2 in the Z-direction of the discharge path 74. As shown in FIG. 6 and the like of the first embodiment described above, each of the blowoff ports 541*a*, 541*b* is formed to have the smaller width d4 than the length and the width of each of the circulation paths S1*a*, S1*b* in the circulation path S1 that are divided by the partition wall 56. The length and the width of each of the circulation paths S1*a*, S1*b* indicate the length thereof in the X-direction and the length thereof in the Y-direction.

Also in the blowoff structure of this embodiment, in the lateral surface 11*c* (the guide surface 51*b*), the first wall section 51, and the second wall section 52 that form the circulation path S1*a*, the laminar flow with the height H2 in the Z-direction and the width d4 flows into the circulation path S1*a* while the air flows into the circulation path S1*a* along the second wall section 52. The width d4 is smaller than the width in the X-direction and the length in the Y-direction of the flow path cross section of the circulation path S1*a* in the Y-direction. In the example of FIG. 17, the lateral surface at the end of the first guide section 50A in the Y-direction corresponds to the guide surface 51*b* of the above-described first embodiment.

The laminar flow that flows along the second wall section 52 from the blowoff port 541*a* that is the opening at the end of the discharge path 74 of the first guide section 50A in the Y-direction changes a direction thereof to the X-direction along the first wall section 51 when reaching the first wall section 51, and then flows toward the partition wall 56. The laminar flow that has reached the partition wall 56 further changes the direction thereof to the Y-direction along the partition wall 56, and flows toward the guide surface 51*b* (the lateral surface 11*c*). The laminar flow that has reached the guide surface 51*b* flows toward the second wall section 52 along the guide surface 51*b*. Just as described, when the laminar flow of the air is swirled along the inner surface of the circulation path S1*a*, the swirling vortex flow can be generated that has the longitudinal direction of the lateral surface 11*c* as the rotational axis and has a cooling length in the X-direction of the lateral surface 11*c*. The same can be said for the blowoff port 541*b*.

The temperature adjusting structure of the battery pack 1 in this embodiment has a first temperature adjusting structure in which the air is brought into contact with the bottom surface 11*b* of the unit cell 10 for the temperature adjustment and a second temperature adjusting structure in which the air is brought into contact with the lateral surface 11*c* of the unit cell 10 for the temperature adjustment. An exhaust path (the discharge path 74) of the first temperature adjusting structure serves as a supply path (S2) of the second temperature adjusting structure.

The air that is supplied substantially perpendicularly to the bottom surface 11*b* of the each unit cell 10 from the air intake path P that is formed on the bottom surface of the battery assembly 100 and extends in the X-direction does not flow through a space between the adjacent unit cells 10 but flows along the bottom surface 11*b* and the lateral surface 11*c* of the each unit cell 10 separately to exchange the heat with the each unit cell 10.

According to this embodiment, the temperature adjusting air that contacts the unit cell 10 contacts the bottom surface 11*b* of the unit cell 10. Then, the air that has contacted the bottom surface 11*b* further contacts the lateral surface 11*c* for the heat exchange. Thus, compared to the case where the air is only brought into contact with the lateral surface 11*c*, the temperature of the unit cell 10 can further be adjusted efficiently. In addition, the battery pack 1 can be downsized in the X-direction (in the direction that the unit cells 10 are aligned).

Figure 18:
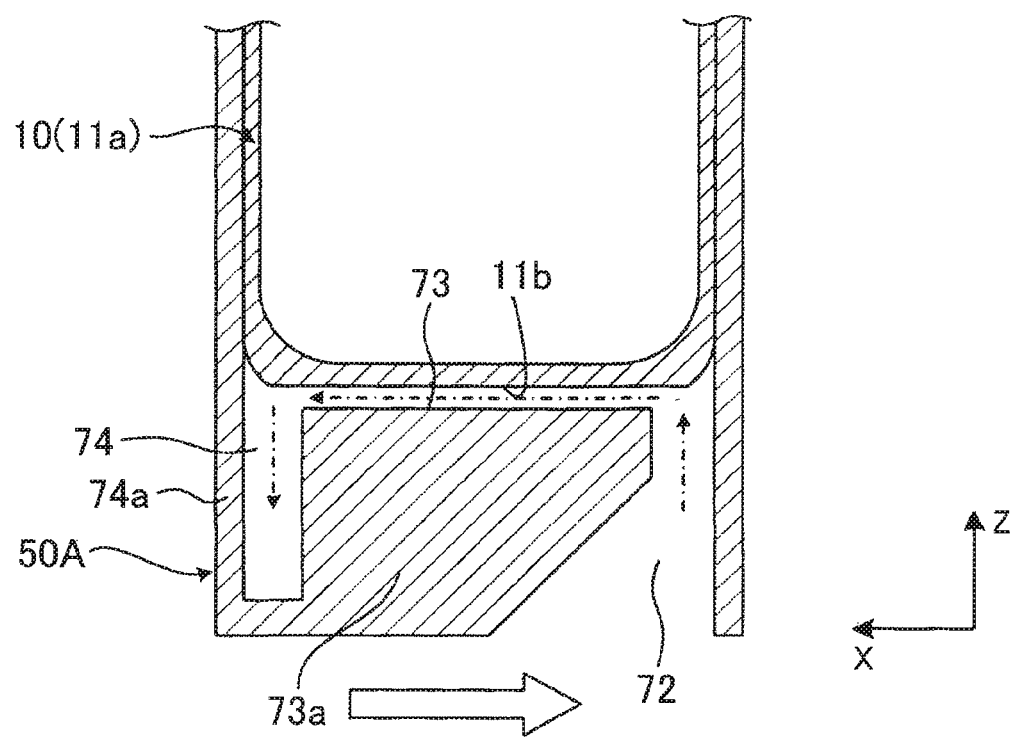
FIG. 18 is a view of a first modified example of the temperature adjusting structure on a bottom surface of a battery assembly in the second embodiment.
Figure 19:
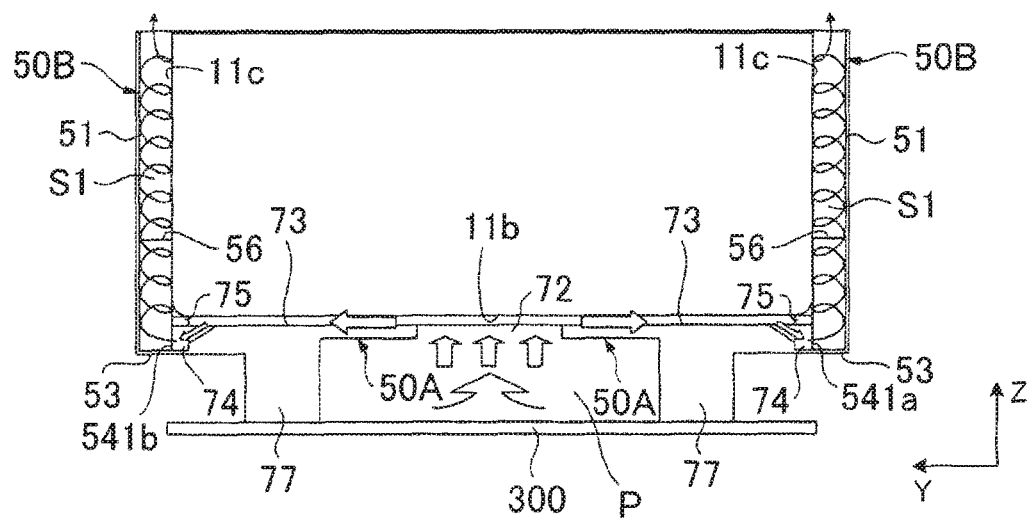
FIG. 19 is a view of a second modified example of the temperature adjusting structure on the bottom surface of the battery assembly in the second embodiment.

FIG. 18 and FIG. 19 are views of modified examples of this embodiment. FIG. 18 is a cross-sectional view of a modified example of the supply path 72 in the first guide section 50A. As shown in FIG. 18, the arrangement of the supply path 72 in the X-direction is changed. The supply path 72 is arranged not in the vicinity of the center of the bottom surface 11*b* of the unit cell 10 in the X-direction but on the end side of the bottom surface 11*b* in the X-direction. The supply path 72 is provided on the one end side of the bottom surface 11*b* of the unit cell 10 in the X-direction, and the discharge path 74 is provided on the other end side via a guide surface 73. The air that is guided from the supply path 72 to the bottom surface 11*b* flows from the one end side to the other end side in the X-direction. Also in this case, the uniform air with the length L flows in the X-direction. Thus, the length of the path for the heat exchange is reduced, and the unit cell 10 can efficiently be cooled.

The modified example of the temperature adjusting structure of the lateral surface 11*c*, which is shown in FIG. 8 of the above-described first embodiment, can be adopted for the temperature adjusting structure of the bottom surface 11*b* shown in FIG. 18, and the guide section 500 of this embodiment can be configured.

Next, FIG. 19 is a view of a modified example of the temperature adjusting structure of the bottom surface 11*b* described above. In the modified example of FIG. 19, the air that is supplied substantially perpendicularly in the Z-direction to the bottom surface 11b of the unit cell 10 circulates in the length direction (the Y-direction) of the unit cell 10 and contacts the unit cell 10.

The guide section 500 of the modified example in FIG. 19 can be configured by including two horizontally symmetrical guide sections. For example, in the guide section 500 shown in FIG. 11, the first guide section 50A (the guide section body 71) is separated in the X-direction in a region between the paired legs 77, and the first guide sections 50A can be arranged with respect to the bottom surface 11b of the unit cell 10 with a gap being provided therebetween in the Y-direction.

In addition, the air intake path P is formed between the legs 77 of the two first guide sections 50A that are arranged to separate from each other in the Y-direction, and an opening between the two first guide sections 50A with respect to the bottom surface 11b of the unit cell 10 forms the supply path 72. The guide surface 73 has the substantially same width as the bottom surface 11b of the unit cell 10 in the X-direction, and extends in the Y-direction. The discharge path 74 is provided at an end of the each guide surface 73 in the Y-direction, and the air that circulates in the Y-direction along the bottom surface 11b of the unit cell 10 is guided to the discharge path 74.

The guide surface is located lower than the mounting surface 75 in the Z-direction, and a space through which the air flows in the Y-direction is formed between the bottom surface 11b and the guide surface 73. A step is formed between the mounting surface 75 and the guide surface 73 in the Z-direction, and the mounting surface 75 is provided in a region at the end of the guide surface 73 in the Y-direction.

As shown in FIG. 19, the air flows upward in the Z-direction from the air intake path P and contacts the bottom surface 11b substantially perpendicularly in the Z-direction, the bottom surface 11b being planar in the X-direction. The air that has contacted the bottom surface 11b substantially perpendicularly changes a direction thereof at approximately 90 degrees and flows through spaces between the guide surfaces 73 and the bottom surface 11b on both of the sides in the Y-direction of the supply path 72 in the length direction of the bottom surface 11b. The air with the width D in the X-direction that has flown in the length direction of the bottom surface 11b by the guide surface 73 flows toward the end of the unit cell 10 in the Y-direction. The end of the each first guide section 50A in the Y-direction is provided with the discharge path 74 that has one of the blowoff ports 541a, 541b with respect to the circulation path S1 of the second guide section 50B. Thus, similar to the example of FIG. 11, the air flows along the lateral surface 11c after flowing along the guide surface 73, and is exhausted from the exhaust port of the circulation path S1. The temperature adjusting structure of the lateral surface 11c, which is shown in FIG. 5 or FIG. 8 of the above-described first embodiment, can be adopted for the temperature adjusting structure of the bottom surface 11b shown in FIG. 19.

The invention claimed is:

1. A temperature adjusting structure for an electric power storage device comprising:
   an electric power storage device including electric power storage elements that are aligned in a specified direction, wherein the electric power storage elements are stacked in the specified direction so that stacking surfaces of the electric storage elements face each other without spacers therebetween, each of the electric power storage elements including an electric power generation element and a case that houses the electric storage generation element, the electric power generation element configured to perform charging and discharging;
   a circulation path provided on a lateral surface of each of the cases, wherein for each of the cases a longitudinal direction of the circulation path is parallel to a direction in which a bottom surface of the case faces a surface that opposes the bottom surface, the lateral surface being a surface positioned on both sides of the case that are spaced apart in a horizontal direction when the electric power storage device is viewed in the specified direction, the circulation path being configured to guide temperature adjusting air in the longitudinal direction of the circulation path provided on the lateral surface of the case without bringing the air into contact with the stacking surfaces of the electric storage elements, and the air exchanging heat with the case; and
   a vortex flow generation section configured to generate a vortex flow of the air that flows into the circulation path, the vortex flow swirling with the longitudinal direction being a rotational axis.

2. The temperature adjusting structure according to claim 1, wherein
   the circulation path includes:
   a first wall section opposing the lateral surface in the horizontal direction and extending in the longitudinal direction; and
   a second wall section covering a space between the lateral surface and the first wall section in a width direction that is orthogonal to the horizontal direction, the second wall section extending in the longitudinal direction,
   the vortex flow generation section includes a blowoff port through which the air flows into the circulation path, and
   a length of the blowoff port in the width direction is smaller than a length in the width direction and a length in the horizontal direction of a flow path cross section in the horizontal direction of the circulation path.

3. The temperature adjusting structure according to claim 2, further comprising:
   a partition wall that partitions the circulation path along the longitudinal direction, wherein
   the blowoff port is provided in the each circulation path that is partitioned by the partition wall and extends in the longitudinal direction.

4. The temperature adjusting structure according to claim 1, further comprising:
   a supply path that supplies the air in a perpendicular direction to the bottom surface; and
   a guide surface that circulates the air along the bottom surface, the air flowing from the supply path to exchange heat with the bottom surface, wherein
   the air that circulates along the bottom surface by the guide surface is supplied to the circulation path via the vortex flow generation section.

* * * * *